United States Patent
Rosenfeld et al.

(10) Patent No.: US 6,770,186 B2
(45) Date of Patent: Aug. 3, 2004

(54) RECHARGEABLE HYDROGEN-FUELED MOTOR VEHICLE

(75) Inventors: Oren Rosenfeld, Mazkeret-Batya (IL); Jonathan Russell Goldstein, Jerusalem (IL); Nimrod Sandeerman, Ramat Gan (IL)

(73) Assignee: Eldat Communication Ltd., Tel Aviv (IL)

( * ) Notice: Subject to any disclaimer, the term of this patent is extended or adjusted under 35 U.S.C. 154(b) by 244 days.

(21) Appl. No.: 10/014,328

(22) Filed: Nov. 13, 2001

(65) Prior Publication Data

US 2003/0091503 A1 May 15, 2003

(51) Int. Cl.⁷ .............................. C25B 1/02; C25B 9/00; C25G 3/00; C25D 17/00; H01M 8/14
(52) U.S. Cl. ...................... 205/343; 205/637; 204/265; 204/266; 204/277; 204/278; 204/290.01; 204/270; 204/292; 429/16
(58) Field of Search ................... 204/266, 278, 204/292, 290.01, 263–265, 277, 270; 205/334, 343, 637–639; 429/16

(56) References Cited

U.S. PATENT DOCUMENTS

| | | | |
|---|---|---|---|
| 3,080,440 A | 3/1963 | Ruetschi et al. ............. | 136/3 |
| 3,607,427 A | 9/1971 | White ......................... | 136/86 |
| 3,669,751 A | 6/1972 | Richman .................... | 136/86 C |
| 3,698,795 A | 10/1972 | Flint ........................... | 350/162 R |
| 3,876,470 A | 4/1975 | McBreen ..................... | 136/30 |
| 4,002,886 A | 1/1977 | Sundelin .................... | 235/61.7 R |
| 4,041,221 A | 8/1977 | Berchielli et al. ........... | 429/206 |
| 4,113,921 A | 9/1978 | Goldstein et al. ............ | 429/27 |
| 4,139,149 A | 2/1979 | Crepeau et al. ............. | 235/383 |
| 4,294,891 A | 10/1981 | Yao et al. ...................... | 429/2 |
| 4,344,831 A | * 8/1982 | Weber ........................ | 204/228 |
| 4,361,474 A | * 11/1982 | Shoaf et al. ................. | 204/239 |

(List continued on next page.)

FOREIGN PATENT DOCUMENTS

| | | |
|---|---|---|
| AU | 9923674 | 10/1999 |
| DE | 19840248 | 3/2000 |
| DE | 19840251 | 3/2000 |
| EP | 0837439 | 4/1998 |
| EP | 974918 A2 | 1/2000 |
| FR | 2772529 | 6/1999 |
| FR | 2778775 | 11/1999 |
| GB | 2249854 | 5/1992 |
| JP | 2000152857 | 6/2000 |
| SE | 9103048 | 11/1994 |
| WO | WO 95/22798 | 8/1995 |
| WO | WO 96/32683 | 10/1996 |
| WO | WO 98/00819 | 1/1998 |
| WO | WO 98/18094 | 4/1998 |
| WO | WO 98/32115 | 7/1998 |
| WO | WO 99/65288 | 12/1999 |

OTHER PUBLICATIONS

"A Methanol Impermeable Proton Conducting Composite Electrolyte System", Cong Pu, et al., Journal of the Electrochemical Society, vol. 142, No. 7, Jul. 1995.

(List continued on next page.)

Primary Examiner—Donald R. Valentine
(74) Attorney, Agent, or Firm—Ladas & Parry

(57) ABSTRACT

A hydrogen-fueled motor vehicle including at least one hydrogen-fueled locomotion subsystem and at least one refuelable hydrogen generator operative to supply hydrogen fuel to the hydrogen-fueled locomotion subsystem on demand. The refuelable hydrogen generator includes at least one electrochemical reactor operative to generate the hydrogen fuel from water on demand and a refueling subsystem providing at least one of water, electrolyte, hydrogen, a metal containing material and electrical power to the electrochemical reactor. A refueling method is also provided.

68 Claims, 19 Drawing Sheets

U.S. PATENT DOCUMENTS

| | | | | |
|---|---|---|---|---|
| 4,387,297 | A | 6/1983 | Swartz et al. | 235/462 |
| 4,409,470 | A | 10/1983 | Shepard et al. | 235/472 |
| 4,521,677 | A | 6/1985 | Sarwin | 235/385 |
| 4,704,003 | A | 11/1987 | Komaki | 350/344 |
| 4,710,820 | A | 12/1987 | Roberts | 358/231 |
| 4,737,161 | A | 4/1988 | Szydlowski et al. | 48/61 |
| 4,760,248 | A | 7/1988 | Swartz et al. | 235/472 |
| 4,766,295 | A | 8/1988 | Davis et al. | 235/383 |
| 4,782,219 | A | 11/1988 | Crater | 235/462 |
| 5,019,811 | A | 5/1991 | Olsson et al. | 340/825.17 |
| 5,089,107 | A | 2/1992 | Pacheco | 204/228 |
| 5,119,768 | A | 6/1992 | Russell | 123/1 A |
| 5,151,684 | A | 9/1992 | Johnsen | 340/572 |
| 5,159,900 | A * | 11/1992 | Dammann | 204/278 X |
| 5,176,809 | A * | 1/1993 | Simuni | 204/273 |
| 5,243,504 | A | 9/1993 | Sejzer | 362/154 |
| 5,313,569 | A | 5/1994 | Olsson et al. | 395/118 |
| 5,345,071 | A | 9/1994 | Dumont | 235/383 |
| 5,361,871 | A | 11/1994 | Gupta et al. | 186/61 |
| 5,372,617 | A | 12/1994 | Kerrebrock et al. | 48/61 |
| 5,374,815 | A | 12/1994 | Waterhouse et al. | 235/383 |
| 5,382,779 | A | 1/1995 | Gupta | 235/383 |
| 5,448,226 | A | 9/1995 | Failing et al. | 340/825.35 |
| 5,457,307 | A | 10/1995 | Dumont | 235/383 |
| 5,465,085 | A | 11/1995 | Caldwell et al. | 340/825.35 |
| 5,467,474 | A | 11/1995 | Ackerman et al. | 395/800 |
| 5,473,146 | A | 12/1995 | Goodwin, III | 235/383 |
| 5,514,353 | A | 5/1996 | Adlhart | 422/239 |
| 5,539,393 | A | 7/1996 | Barfod | 340/825.52 |
| 5,553,412 | A | 9/1996 | Briechle et al. | 40/642 |
| 5,572,653 | A | 11/1996 | DeTemple et al. | 395/501 |
| 5,575,100 | A | 11/1996 | Marvin et al. | 40/642 |
| 5,635,915 | A | 6/1997 | Gray | 340/825.57 |
| 5,753,900 | A | 5/1998 | Goodwin, III et al. | 235/383 |
| 5,762,658 | A | 6/1998 | Edwards et al. | 48/127.7 |
| 5,828,427 | A | 10/1998 | Faris | 349/5 |
| 5,833,934 | A | 11/1998 | Adlhart | 422/239 |
| 5,846,669 | A | 12/1998 | Smotkin et al. | 429/41 |
| 5,847,378 | A | 12/1998 | Goodwin, III | 235/383 |
| 5,880,449 | A | 3/1999 | Teicher et al. | 235/383 |
| 5,910,653 | A | 6/1999 | Campo | 250/214 AL |
| 5,933,813 | A | 8/1999 | Teicher et al. | 705/26 |
| 5,968,325 | A | 10/1999 | Oloman et al. | 204/230.5 |
| 5,975,416 | A | 11/1999 | Chow et al. | 235/383 |
| 6,011,487 | A | 1/2000 | Plocher | 340/825.49 |
| 6,031,585 | A | 2/2000 | Stevens, III | 349/1 |
| 6,069,596 | A | 5/2000 | Marvin et al. | 345/52 |
| 6,081,558 | A | 6/2000 | North | 375/316 |
| 6,081,612 | A | 6/2000 | Gutkowicz-Krusin et al. | 382/128 |
| 6,085,576 | A | 7/2000 | Sunshine et al. | 73/29.01 |
| 6,091,884 | A | 7/2000 | Yuen et al. | 386/83 |
| 6,094,007 | A | 7/2000 | Faul et al. | 313/512 |
| 6,099,522 | A | 8/2000 | Knopp et al. | 606/10 |
| 6,104,939 | A | 8/2000 | Groner et al. | 600/322 |
| 6,105,004 | A | 8/2000 | Halperin et al. | 705/28 |
| 6,119,990 | A | 9/2000 | Kump et al. | 248/220.22 |
| 6,162,267 | A | 12/2000 | Priegnitz et al. | 48/199 FM |
| 6,211,934 | B1 | 4/2001 | Habing et al. | 340/105 |
| 6,223,843 | B1 | 5/2001 | O'Connell et al. | 180/65.3 |
| 6,238,813 | B1 | 5/2001 | Maile et al. | 429/9 |
| 6,259,971 | B1 | 7/2001 | Mitchell et al. | 700/286 |
| 6,269,342 | B1 | 7/2001 | Brick et al. | 705/20 |
| 6,326,097 | B1 | 12/2001 | Hockaday | 429/34 |
| 6,432,283 | B1 * | 8/2002 | Fairlie et al. | 204/230.2 |

OTHER PUBLICATIONS

"PT2000 Portable Terminal", pp. 1–2; http://www.percon.com/html/pt2000.htm no date.

Buckle, J. (editor), "Sending Out Clear Signals", European Supermarkets, Mar./Apr. 1999, pp. 26–32.

Research Disclosure 34494, "Electronic Price Tag", Anonymous, Dec. 1992, p. 969.

* cited by examiner

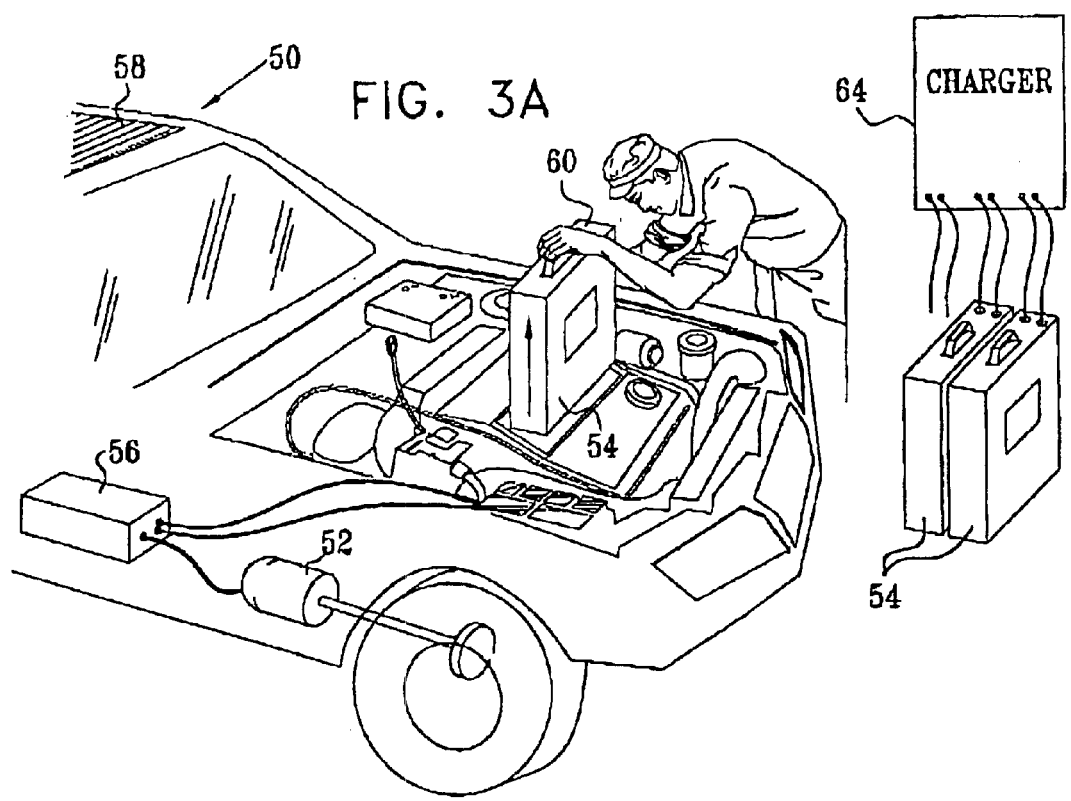
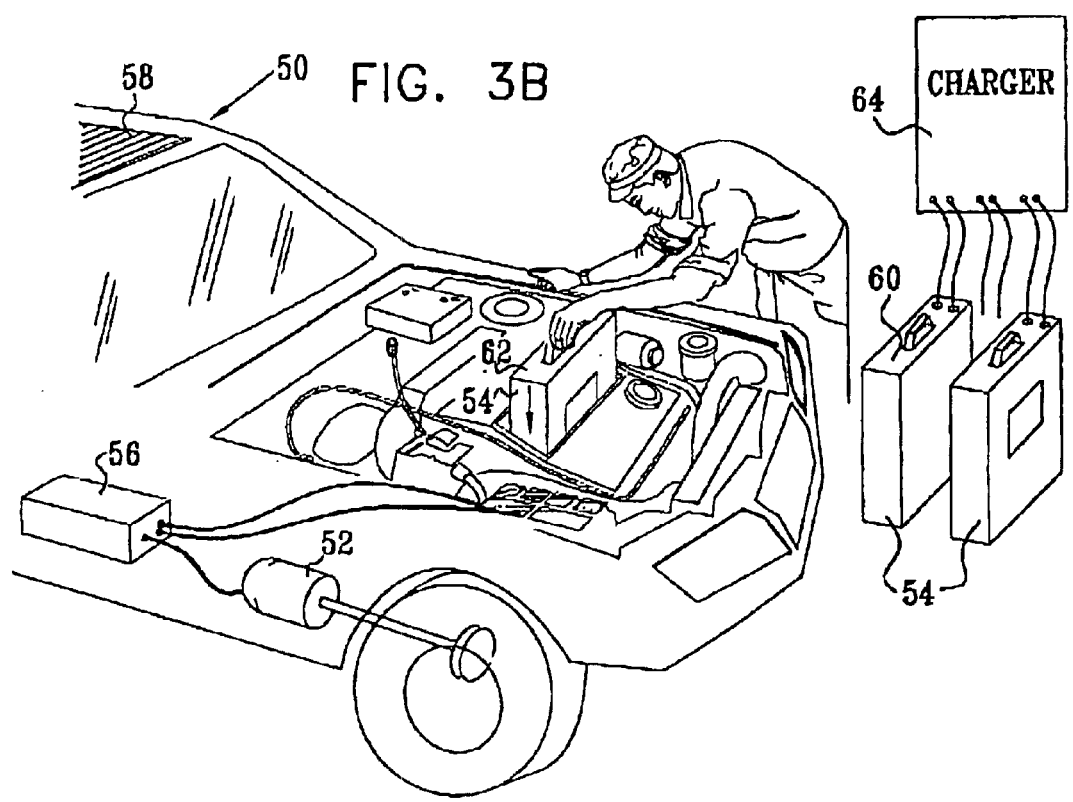

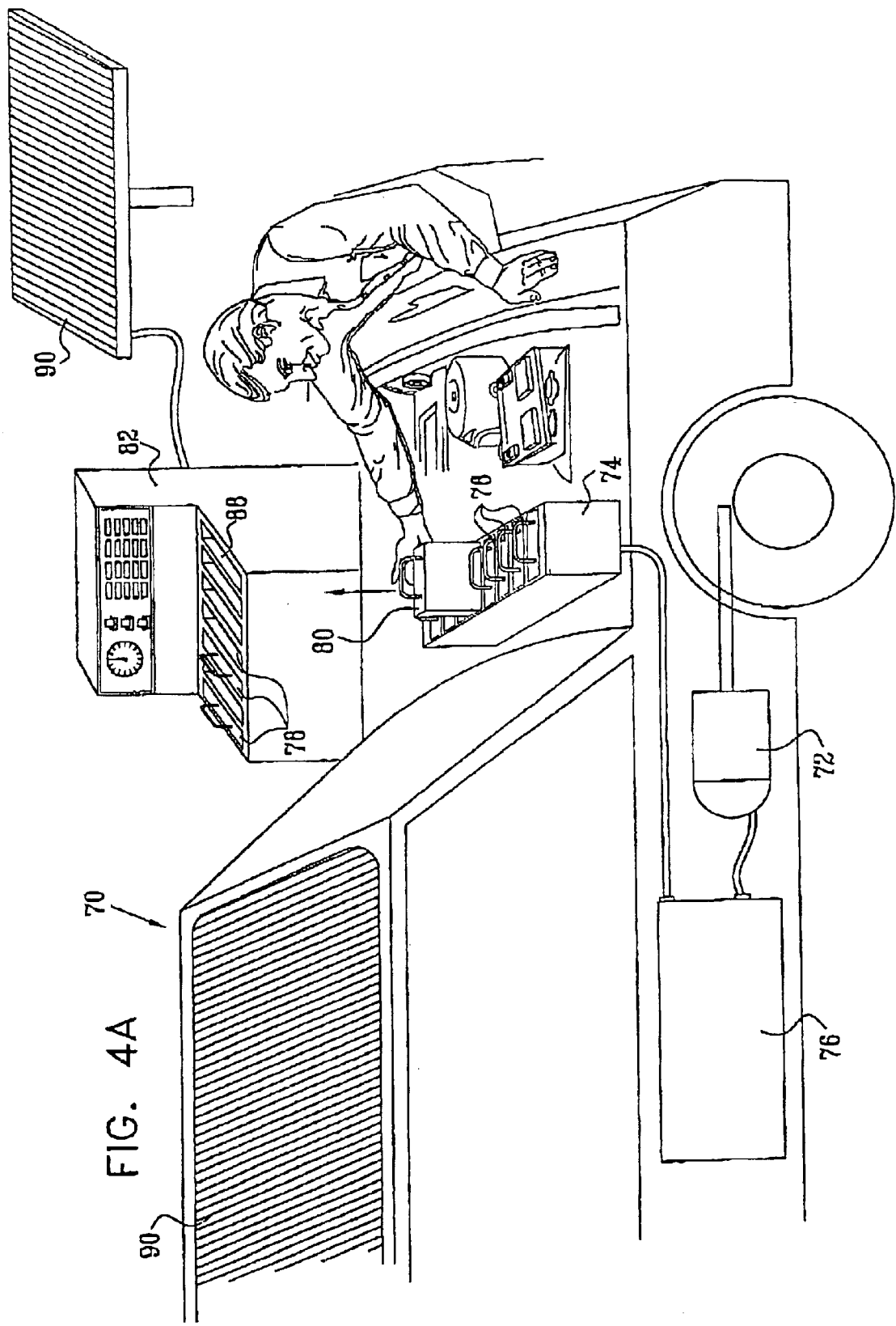

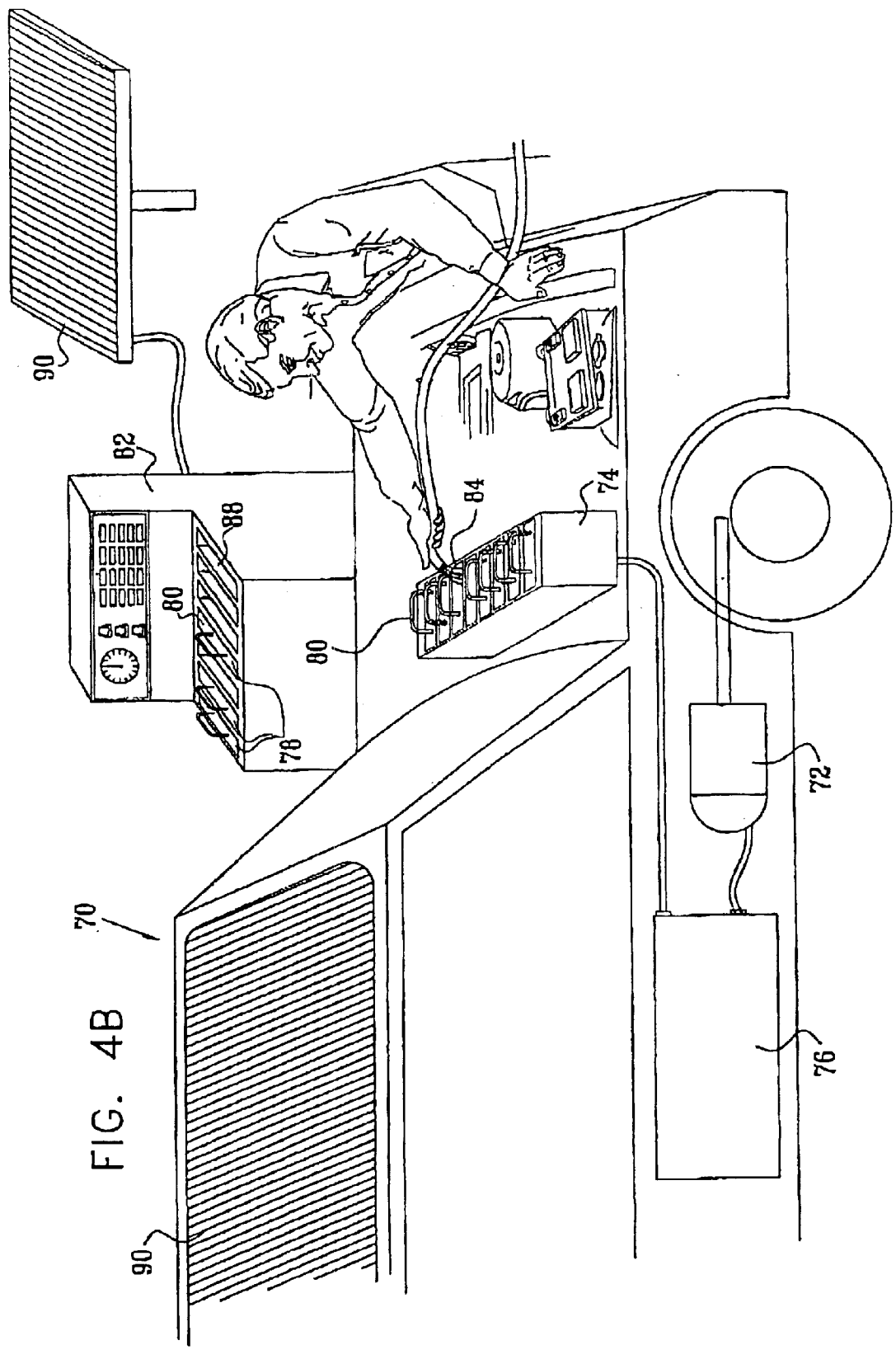

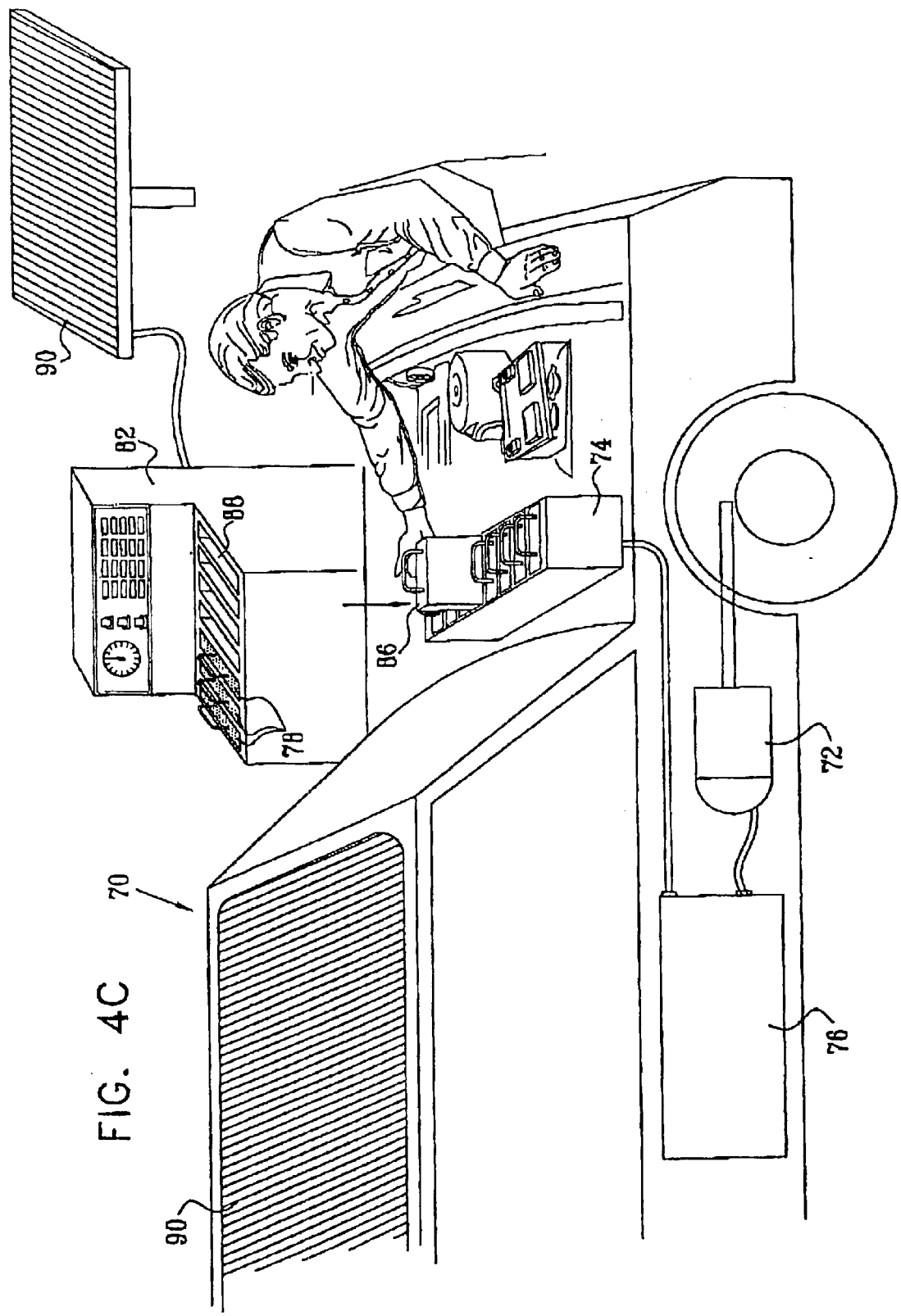

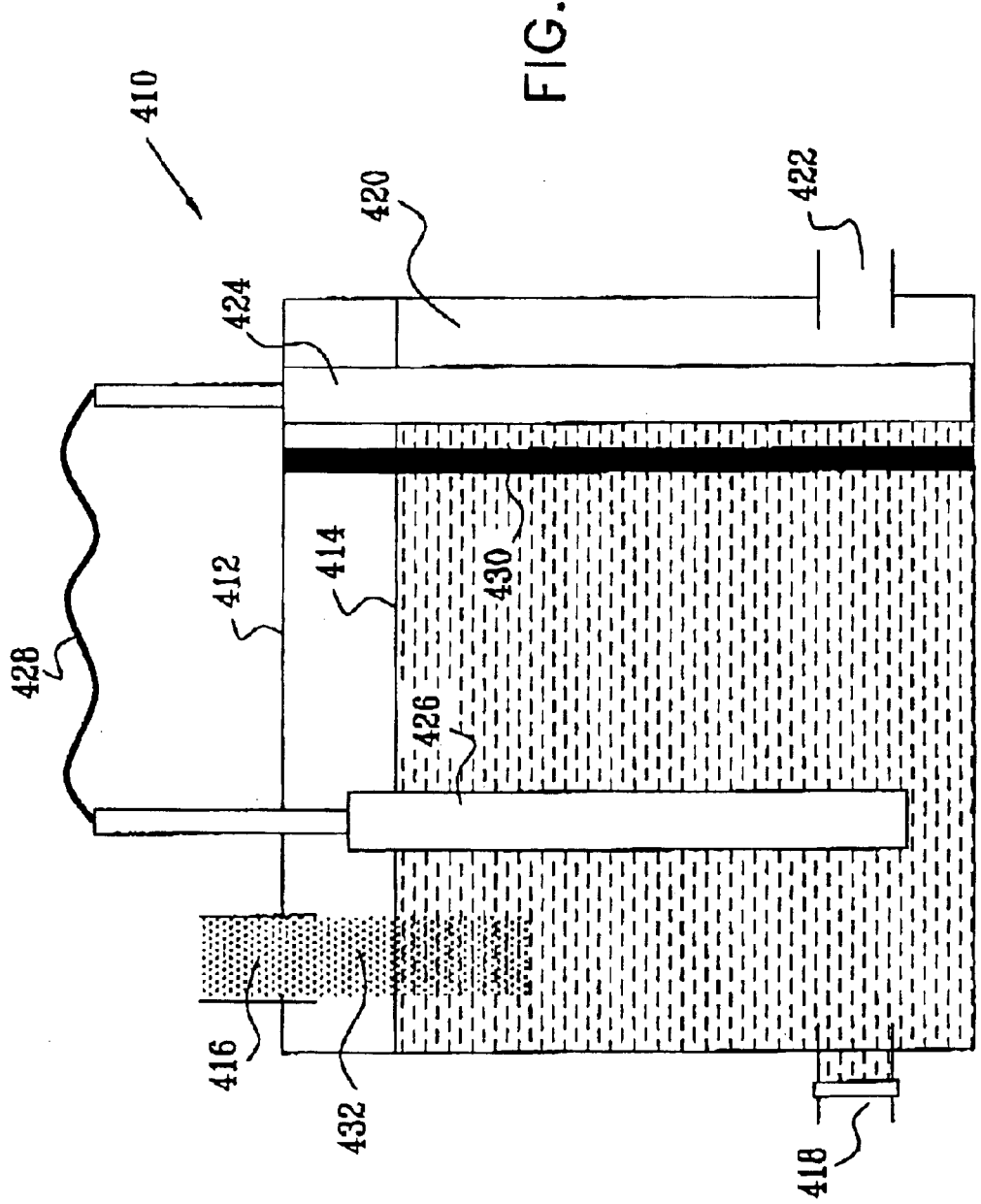

RECHARGEABLE HYDROGEN-FUELED MOTOR VEHICLE

FIELD OF THE INVENTION

The present invention relates to rechargeable hydrogen-fueled motor vehicles as well as to systems and methods for recharging hydrogen-fueled motor vehicles.

BACKGROUND OF THE INVENTION

The following U.S. Patents and other patent documents are believed to represent the current state of the art: U.S. Pat. Nos. 6,223,843; 6,162,267; 6,105,004; 6,104,939; 6,099,522; 6,091,884; 6,085,576; 6,081,612; 6,081,558; 6,031,585; 5,975,416; 5,968,325; 5,933,813; 5,880,449; 5,846,669; 5,833,934; 5,833,934; 5,762,658; 5,753,900; 5,572,653; 5,553,412; 5,539,393; 5,514,353; 5,457,307; 5,382,779; 5,372,617; 5,361,871; 5,345,071; 5,313,569; 5,119,768; 5,089,107; 5,019,811; 4,782,219; 4,766,295; 4,760,248; 4,737,161; 4,521,677; 4,409,470; 4,387,297; 4,139,149; 4,041,221; 4,002,886; 3,876,470; 3,669,751; 3,607,427; 3,080,440; JP 2000152857; DE 19840248; DE 19840251; EP 974918A2; AU 9923674; FR 2778775; FR 2772529; FR 2778775; SE 9103048; GB 2249854; EP 0837439; WO 95/22798; WO 98/00819; WO 98/32115; WO 99/65288; WO 96/32683; WO 98/32115.

The present applicant/assignee is the proprietor of the following issued patents and patent applications:

U.S. Pat. Nos. 5,880,449; 5,933,813; 6,105,004; 4,113,921.

US Patent Application Nos. U.S. Ser. No. 09/147,422, now U.S. Pat. No. 6,205,396; Ser. No. 08/839,838, now U.S. Pat. No. 6,105,004; Ser. No. 08/632,576, now U.S. Pat. No. 5,933,813; Ser. No. 08/699,375 now U.S. Pat. No. 5,880,449.

PCT-IL-97/00339 and PCT-IL-97/00192.

WO 98/00819; WO 96/32683.

Reference is also made to:

"A Methanol Impermeable Proton Conducting Composite Electrolyte System", Cong Pu et al, Journal of the Electrochemical Society Vol. 142, No. 7 July 1995;

"PT2000 Portable Terminal", pp 1–2; http://www.percon.com/html/pt2000.htm

Buckle, J (editor) "Sending Out Clear Signals", European Supermarkets. March/April 1999, pp 26–32; and Research Disclosure 34494, "Electronic Price Tag", Anonymous, December 1992. pp 969.

SUMMARY OF THE INVENTION

The present invention seeks to provide improved hydrogen-fueled motor vehicles as well as systems and methods for recharging hydrogen-fueled motor vehicles.

There is thus provided in accordance with a preferred embodiment of the present invention a hydrogen-fueled motor vehicle, which includes at least one hydrogen-fueled locomotion subsystem and at least one refuelable hydrogen generator operative to supply hydrogen fuel to the hydrogen-fueled locomotion subsystem on demand. The refuelable hydrogen generator includes at least one electrochemical reactor operative to generate the hydrogen fuel from water on demand; and a refueling subsystem providing at least one of water, electrolyte, hydrogen, a metal containing material and electrical power to the electrochemical reactor.

There is also provided in accordance with a preferred embodiment of the present invention a hydrogen-fueled motor vehicle, which includes at least one hydrogen-fueled locomotion subsystem, at least one hydrogen generator operative to supply hydrogen fuel to the hydrogen-fueled locomotion subsystem, the hydrogen generator including an electrochemical reactor operative to generate the hydrogen fuel from water on demand and a refueling subsystem enabling at least one of water, electrolyte, hydrogen, metal, electrical power and a replacement hydrogen generator to be provided to the vehicle.

There is further provided in accordance with a preferred embodiment of the present invention a hydrogen-fueled motor vehicle system, which includes at least one hydrogen-fueled motor vehicle. The motor vehicle includes a hydrogen-fueled locomotion subsystem and a hydrogen generator operative to supply hydrogen fuel to the hydrogen-fueled locomotion subsystem, the hydrogen generator including an electrochemical reactor operative to generate the hydrogen fuel from water on demand and a refueling subsystem enabling at least one of water, electrolyte, hydrogen, metal, electrical power and a replacement hydrogen generator to be provided to the vehicle.

There is further provided in accordance with yet another preferred embodiment of the present invention a method for recharging a hydrogen-fueled motor vehicle, which includes at least one hydrogen-fueled locomotion subsystem, at least one refuelable hydrogen generator operative to supply hydrogen fuel to the hydrogen-fueled locomotion subsystem on demand. The refuelable hydrogen generator includes an electrochemical reactor operative to generate the hydrogen fuel from water on demand. The method includes supplying at least one of water, electrolyte, hydrogen, a metal containing material and electrical power to the electrochemical reactor.

Further in accordance with a preferred embodiment of the present invention the hydrogen-fueled locomotion subsystem includes a fuel cell and an electrical motor powered thereby.

Still further in accordance with a preferred embodiment of the present invention the hydrogen-fueled motor vehicle also includes a water recycler operative to supply water produced by the locomotion subsystem to the refuelable hydrogen generator.

Preferably, the hydrogen-fueled locomotion subsystem includes an internal combustion engine.

Additionally in accordance with a preferred embodiment of the present invention the hydrogen-fueled motor vehicle further includes an operator controlled hydrogen-fuel generation controller which is operative in response to an input from a vehicle operator for determining the quantity of hydrogen generated by the hydrogen generator at a given time.

Further in accordance with a preferred embodiment of the present invention the hydrogen generator includes at least one hydrophobic cathode including at least one of a Teflon coating, layer and binder.

Still further in accordance with a preferred embodiment of the present invention the cathode is operative as a hydrogen-generating and as a hydrogen-consuming electrode.

Further in accordance with a preferred embodiment of the present invention the refueling subsystem is operative to recharge at least one refuelable hydrogen generator while at least one other refuelable hydrogen generator is operative to supply hydrogen fuel to the hydrogen-fueled locomotion subsystem Additionally in accordance with a preferred embodiment of the present invention the electrical power is provided by solar cells.

Further in accordance with a preferred embodiment of the present invention the electric power is provided by regenerative braking.

Additionally in accordance with a preferred embodiment of the present invention the electric power is provided to the electrochemical reactors while at least one of the electrochemical reactors is generating hydrogen.

Still further in accordance with a preferred embodiment of the present invention the electrochemical reactor is replaceable.

Additionally in accordance with a preferred embodiment of the present invention the hydrogen generator includes at least one anode and wherein the anode is replaceable. Preferably, the anode includes at least one of powder, granules and coated particles.

Further in accordance with a preferred embodiment of the present invention the electrochemical reactor includes a slowly consumable anode and a quickly consumable electrolyte.

Typically the slowly consumed anode includes at least one of aluminum and aluminum alloy and wherein the electrolyte includes at least one of an alkaline electrolyte based on potassium hydroxide solution and a halide electrolyte based on aluminum chloride solution.

Still further in accordance with a preferred embodiment of the present invention the hydrogen-fueled locomotion system includes at least one electric motor and at least one fuel cell that provided electric power to the electric motor.

Additionally in accordance with a preferred embodiment of the present invention the electrochemical reactor is operative to provide hydrogen to a hydrogen buffer tank and the hydrogen buffer tank is operative to provide hydrogen to the hydrogen-fueled locomotion system.

Typically the electrochemical reactor includes a water-based fuel and includes a salt selected from a group including at least one of halides, trihalides, acetates, sulfates, nitrates, borates, acid salts, chromate, stannate, perchlorate and basic salts of Group I metals, ammonium, Group II metals and Group III metals or a base or an acid, as well as at least one of zinc, iron, aluminum, magnesium, tin, calcium, lithium, sodium, metal hydrides based on nickel or titanium or rare earth metals, and alloys thereof, a catalyst based on at least one of a metal and metal oxide belonging to at least one of the platinum metal group and the transition metal group.

Preferably, the catalyst is formed as a coating on at least one rod, the rod is selectibly introduceable into the water-based fuel.

Additionally or alternatively, the water-based fuel includes zinc and the catalyst includes an impurity in the zinc, the impurity is a transition metal.

Additionally or alternatively, water-based fuel includes iron and the catalyst includes an impurity in the iron, the impurity is a transition metal, which is not iron.

Additionally or alternatively, the water-based fuel includes a hydroxide of at least one of potassium, sodium lithium and their mixtures in solution in water.

Preferably, the acid includes at least one of an inorganic acid and an organic acid.

Further in accordance with a preferred embodiment of the present invention at least one of zinc, iron, aluminum, magnesium, tin, calcium, lithium, sodium, metal hydrides based on nickel or titanium and rare earth metals as well as alloys thereof is disposed in the water based fuel as at least one of powder, granules and coated particles Additionally in accordance with a preferred embodiment of the present invention the electrochemical reactor includes a container containing at least one anode, at least one cathode, an electrolyte and a porous separator sheet separating between the anode and the cathode. Typically, a resistance providing element is connected between the anode and the cathode to control the rate of production of hydrogen by the chemical reactor.

Preferably, the resistance providing element is a pulse width modulator.

Further in accordance with a preferred embodiment of the present invention the electrochemical reactor is controlled by controlling the level of the electrolyte in the container.

Still further in accordance with a preferred embodiment of the present invention the anode includes at least one of zinc, iron and tin in at least one of sheet and plate forms.

Alternatively, the anode includes at least one of cadmium and lead.

Additionally or alternatively, the anode includes at least one of zinc, iron, lead, cadmium and tin provided in the form of at least one of pressed powder and paste pressed on an electrically conducting flat support.

Further in accordance with a preferred embodiment of the present invention the cathode includes at least one of an electrically conducting plate and an electrically conducting mesh supporting a catalyst for hydrogen production, the catalyst including material based on the platinum metal group or the transition metal group.

Still further in accordance with a preferred embodiment of the present invention the electrolyte includes at least one of salts, acids and bases in absorbed or gel form Preferably, the base includes at least one of hydroxides of potassium, sodium, lithium and their mixtures in solution in water.

Preferably, the acid includes at least one of an inorganic acid and an organic acid in aqueous solution.

Further in accordance with a preferred embodiment of the present invention the chemical reactor includes a container containing at least one anode, at least one cathode, an electrolyte and water based fuel wherein the anode includes an electrical conductor and is in direct electrical contact with the water based fuel and the cathode includes an electrical conductor and is coated with a catalyst based on at least one of a metal or metal oxide belonging to at least one of the platinum metal group and the transition metal group. Typically, the electrolyte includes at least one of: a salt including at least one of halides, trihalides, acetates, sulfates, nitrates, borates, acid salts, chromate, stannate, perchlorate and basic salts of Group I metals, ammonium, Group II metals and Group III metals, a base including at least one of hydroxides of potassium, sodium, lithium and their mixtures and an acid preferably including at least one of an inorganic and an organic acid, as well as at least one of zinc, iron, tin, calcium, metal hydrides based on nickel, titanium, rare earth metals and alloys. The water based fuel is disposed in the electrolyte as at least one of powder, granules and coated particles.

Additionally in accordance with a preferred embodiment of the present invention the electrochemical reactor is operative to provide electric power to the electric motor.

Further in accordance with a preferred embodiment of the present invention the hydrogen-fueled locomotion system includes at least one electric motor and at least one fuel cell providing electric power to the electric motor.

Preferably, the electrochemical reactor is operative to provide electric power to the electric motor.

Still further in accordance with a preferred embodiment of the present invention the electrochemical reactor is operative to provide hydrogen to the hydrogen buffer tank and the hydrogen buffer tank is operative to provide hydrogen to the hydrogen-fueled locomotion system.

Further in accordance with a preferred embodiment of the present invention the step of supplying hydrogen for recharging a hydrogen-fueled motor vehicle wherein the electrochemical reactor includes an anode and a cathode, includes providing an electrical connection between the anode and the cathode of the hydrogen generator and providing hydrogen gas to the cathode.

Additionally, in accordance with a preferred embodiment of the present invention the step of supplying hydrogen includes providing an electrical connection between the anode and the cathode of the electrochemical reactor and providing hydrogen gas to the cathode of the electrochemical reactor while at least one another electrochemical reactor generates hydrogen.

There is further provided in accordance with a preferred embodiment of the present invention a method for recharging a hydrogen-fueled motor vehicle. The method includes the steps of: providing at least one hydrogen-fueled locomotion subsystem, providing at least one hydrogen generator operative to supply hydrogen fuel to the hydrogen-fueled locomotion subsystem, the step of providing a hydrogen generator includes providing an electrochemical reactor operative to generate the hydrogen fuel from water on demand, providing a refueling subsystem enabling at least one of water, hydrogen, metal, electrical power and a replacement hydrogen generator to be provided to the vehicle and supplying at least one of water electrolyte, hydrogen, a metal containing material and electrical power from the refueling subsystem to the electrochemical reactor.

There is further provided in accordance with a preferred embodiment of the present invention a method for recharging a hydrogen-fueled motor vehicle system. The method includes providing at least one hydrogen-fueled motor vehicle and includes the steps of: providing at least one hydrogen-fueled locomotion subsystem, providing at least one hydrogen generator operative to supply hydrogen fuel to the hydrogen-fueled locomotion subsystem, the hydrogen generator including an electrochemical reactor operative to generate the hydrogen fuel from water on demand, providing a refueling subsystem enabling at least one of water, hydrogen, metal, electrical power and a replacement hydrogen generator to be provided to the vehicle and supplying at least one of water, electrolyte, hydrogen, a metal containing material and electrical power from the refueling subsystem to the electrochemical reactor.

Further in accordance with a preferred embodiment of the present invention the step of providing hydrogen-fueled locomotion subsystem includes providing a fuel cell and providing an electrical motor powered thereby.

Still further in accordance with a preferred embodiment of the present invention the method also includes recycling water produced by the locomotion subsystem to the refuelable hydrogen generator.

Additionally in accordance with a preferred embodiment of the present invention the step of providing hydrogen-fueled locomotion subsystem includes providing an internal combustion engine.

Further in accordance with a preferred embodiment of the present invention the method also includes controlling the quantity of hydrogen generated by the hydrogen generator at a given time.

Still further in accordance with a preferred embodiment of the present invention the method for recharging a hydrogen-fueled motor vehicle including an electrochemical reactor, which includes an anode and a cathode, the step of supplying hydrogen includes providing an electrical connection between the anode and the cathode of the hydrogen generator, providing hydrogen gas to the cathode.

Further in accordance with a preferred embodiment of the present invention the electrochemical reactor includes an anode and a cathode and wherein the step of supplying hydrogen includes providing an electrical connection between the anode and the cathode of the at least one electrochemical reactor and providing hydrogen gas to the cathode of at least one the electrochemical reactor while at least one another electrochemical reactor generates hydrogen.

There is also provided in accordance with yet a further preferred embodiment of the present invention a method for recharging a hydrogen-fueled motor vehicle. The method includes providing a chemical reactor, which includes a container containing, at least one anode, at least one cathode, an electrolyte and a water based fuel. Typically, the anode includes an electrical conductor and is in direct electrical contact with the water based fuel and the cathode includes an electrical conductor and is coated with a catalyst based on at least one of a metal or metal oxide belonging to at least one of the platinum metal group and the transition metal group. Preferably, the electrolyte includes at least one of: a salt including at least one of halides, trihalides, acetates, sulfates, nitrates, borates, acid salts, chromate, stannate, perchlorate and basic salts of Group I metals, ammonium, Group II metals and Group III metals, a base including at least one of hydroxides of potassium, sodium, lithium and their mixtures and an acid preferably including at least one of an inorganic and an organic acid, as well as at least one of zinc, iron, tin, calcium, metal hydrides based on nickel, titanium, rare earth metals and alloys. Typically, the water based fuel is disposed in the electrolyte as at least one of powder, granules and coated particles. The method also includes the steps of: draining the depleted water based fuel, supplying recharged the water based fuel and supplying the electrolyte.

There is also provided in accordance with a preferred embodiment of the present invention a method for recharging a water based fuel, which includes providing a DC power supply, providing an inert cathode connected to a negative terminal of the DC power supply, providing at least one inert anode connected to a positive terminal the DC power supply, providing at least one motor operative to rotate a scraper paddle operative to scrape deposited materials off the surface of the cathode, supplying depleted water based fuel, which includes at least one of iron, tin, zinc, cadmium, lead, metal hydrides based on nickel, titanium, rare earth metals, and alloys thereof disposed as at least one of powder, granules and coated particles, supplying electrolyte including at least one of: a salt selected from a group consisting of halides, trihalides, acetates, sulfates, nitrates, borates, acid salts, chromate, stannate, perchlorate and basic salts of Group I metals, ammonium, Group II metals and Group III metals, a base, including hydroxides at least one of potassium, sodium, lithium and their mixtures and an acid preferably including at least one of an inorganic and an organic acid, solubilizing the depleted water based fuel, applying DC power between the anode and the cathode and operating the motor to propel the scraper paddle to scrape the deposits off the surface of the cathode.

There is also provided in accordance with a preferred embodiment of the present invention a method for recharging a water based fuel. The method includes providing a container filled with the electrolyte, providing a chamber formed inside the container, providing at least one hydrophobic gas diffusion, hydrogen consuming, cathode, formed as at least one of the walls of the chamber, providing at least one current collector electrically connected to the cathode, providing a porous, electrically insulating separator between the cathode and the anode, supplying electrolyte, which includes a salt selected from a group consisting of halides, trihalides, acetates, sulfates, nitrates, borates, acid salts, chromate, stannate, perchlorate and basic salts of Group I metals, ammonium, Group II metals and Group III metals or a base, preferably including hydroxides of potassium, sodium or lithium or their mixtures thereof or an acid preferably including an inorganic acid such as sulfuric acid, or an organic acid such as citric acid, supplying depleted water based fuel including at least one of zinc, iron, tin, cadmium, lead, metal hydrides based on at least one of nickel and titanium and rare earth metals and alloys thereof disposed in the electrolyte as at least one of powder, granules and coated particles and supplying hydrogen gas the chamber.

BRIEF DESCRIPTION OF THE DRAWINGS

The present invention will be understood and appreciated more fully from the following detailed description, taken in conjunction with the drawings in which:

FIGS. 3A and 3B taken together are a simplified illustration of a preferred embodiment of a refuelable hydrogen-fueled vehicle and a hydrogen generator replacement system therefor;

FIGS. 4A, 4B and 4C taken together are a simplified illustration of a preferred embodiment of a refuelable hydrogen-fueled vehicle and a solid anode replacement system therefor;

FIG. 15 is a simplified illustration of a preferred embodiment of a slurry fuel recharging system for chemically recharging slurry fuel.

DETAILED DESCRIPTION OF PREFERRED EMBODIMENTS

Figure 1:
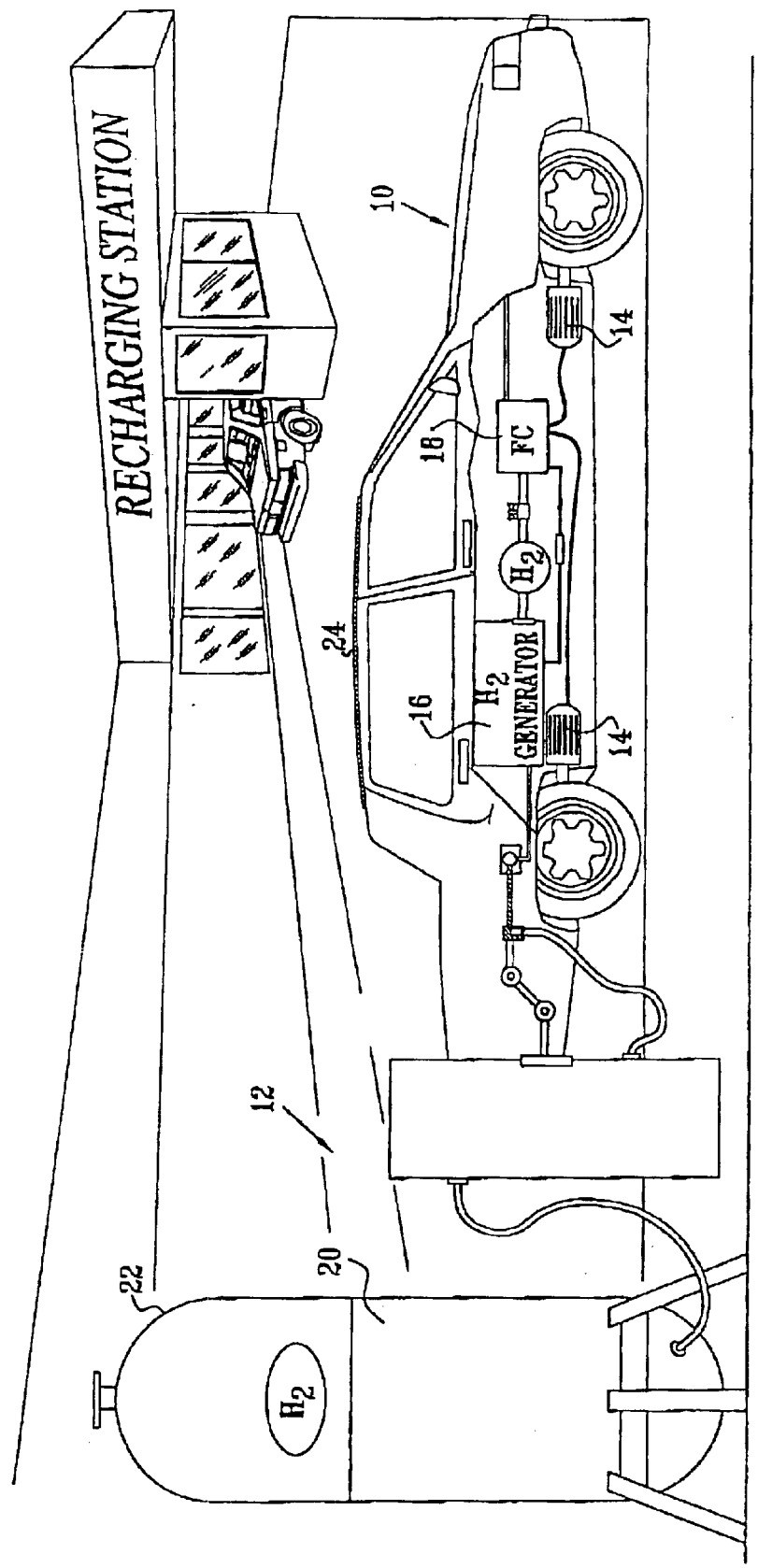
FIG. 1 is a simplified illustration of a preferred embodiment of a refuelable hydrogen-fueled vehicle and a hydrogen recharging system therefor.

Reference is now made to FIG. 1, which is a simplified illustration of a rechargeable hydrogen-fueled vehicle 10 and a hydrogen recharging system 12 for use therewith. The vehicle 10 preferably is propelled by one or more electric motors 14 and comprises an electricity generating system comprising at least one hydrogen generator 16 and at least one fuel cell 18 (FC) to supply electric power to the electric motors 14. The hydrogen generator 16 supplies hydrogen gas to the fuel cells 18 and is suitable for hydrogen recharging. The recharging system 12 preferably supplies hydrogen gas 20 from a hydrogen gas tank 22 to the hydrogen generator 16 to recharge the hydrogen generator 16.

In accordance with one preferred embodiment of the present invention, recharging is performed by supplying hydrogen gas to a suitable hydrogen generator 16, such as that described hereinbelow with respect to FIG. 13.

In this embodiment the hydrogen generator 16 comprises at least one hydrophobic cathode, preferably employing a Teflon coating, layer or binder. This cathode is preferably a bifunctional cathode, constructed as a hydrogen-generating and as a hydrogen-consuming electrode. It is appreciated that the when the hydrogen generator 16 generates hydrogen the cathode operates as a hydrogen-generating cathode. During the time that the hydrogen generator is recharging the cathode operates as a hydrogen-consumer.

Recharging preferably is performed by initially providing an electrical connection between the anode and the cathode of the hydrogen generator and by then providing hydrogen gas to the cathode. The hydrogen reaction at the cathode causes a depleted anode to be reduced so that the original composition of the anode is reconstituted and water is produced. It is appreciated that additional water may be added to the hydrogen generator.

It is appreciated that a hydrogen-powered engine (not shown) can be employed instead of the fuel cells 18 and the electric motors 14. The hydrogen-powered engine may comprise a spark-ignited engine, a diesel engine or a turbine engine. It is also appreciated that the vehicle 10 can be a car, a train, a vessel, an airplane or any other means of transportation.

It is appreciated that electric power for electrical recharging of the hydrogen generator 16 can be provided from solar cells 24. The solar cells 24 can be installed on top of the vehicle 10 and connected to the hydrogen generator 16 or located at a fixed location at a recharging system.

It is appreciated that some electric power for electrical recharging of the hydrogen generator 16 can be provided by regenerative braking when electricity is generated by the at least one electric engines 14 when operative to provide braking power.

It is appreciated that electrical recharging can be applied to one hydrogen generator of the at least one hydrogen generator 16 while other hydrogen generators of the at least one hydrogen generator 16 are operative to produce hydrogen to propel the rechargeable hydrogen-fueled vehicle 10.

Figure 2:
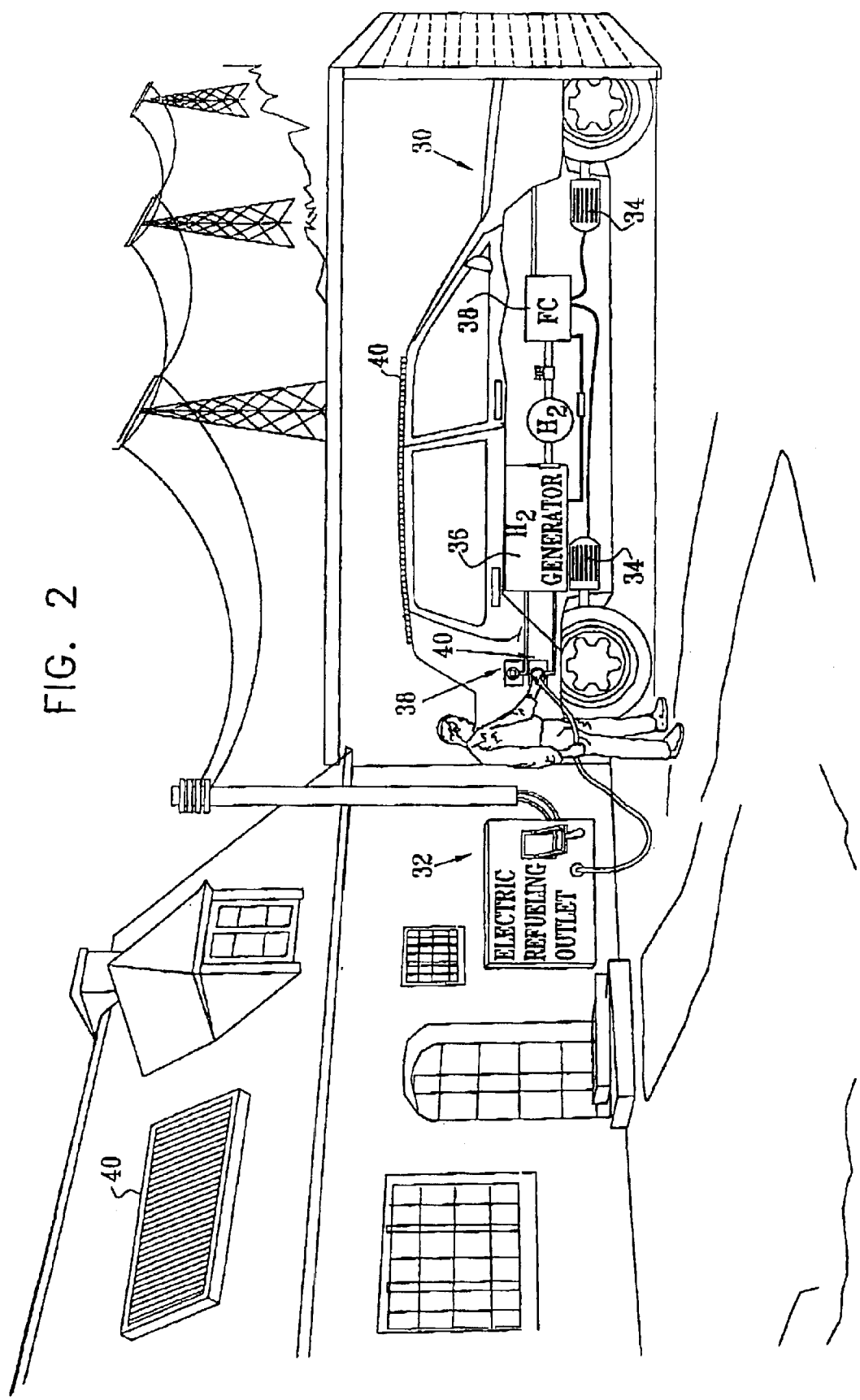
FIG. 2 is a simplified illustration of a preferred embodiment of a refuelable hydrogen-fueled vehicle and an electrical recharging system therefor.

Reference is now made to FIG. 2, which is a simplified illustration of a rechargeable hydrogen-fueled vehicle 30 and an electrical recharging system 32 for use therewith. The vehicle 30 is preferably propelled by electric motors 34 and comprises an electricity generating system comprising at least one hydrogen generator 36 and at least one fuel cell 38 to supply electric power to the electric motors 34. The hydrogen generator 36 supplies hydrogen gas to the fuel cells 38 and is suitable for electrical recharging. The recharging system 32 supplies electricity to the hydrogen generator 36 to recharge the fuel within the hydrogen generator 36.

In accordance with a preferred embodiment of the present invention recharging is performed, optionally by replenishing water, and then by supplying electrical current to electrodes of a suitable hydrogen generator to reconstitute in situ the original composition of the anode, as shown and described below with respect to FIGS. 11 and 12.

It is appreciated that a hydrogen-powered engine (not shown) can be used instead of the fuel cells 38 and the electric motors 34. The hydrogen-powered engine may comprise a spark-ignited engine, a diesel engine or a turbine engine. It is also appreciated that the vehicle 30 can be a car, a train, a vessel, an airplane or any other means of transportation.

It is appreciated that electric power for recharging the vehicle 30 can also be provided by solar cells 40. The solar cells 40 can be installed on top of the vehicle 30 as shown or on top of a building or other structure.

It is also appreciated that some electric power for electrical recharging of the hydrogen generator 36 can be provided by regenerative braking when electricity is generated by the at least one electric motors 34 when operative to provide braking power.

It is further appreciated that electrical recharging can be applied to one hydrogen generator 36 while other hydrogen generators are operative to produce hydrogen to propel the rechargeable hydrogen-fueled vehicle 30.

Reference is now made to FIGS. 3A and 3B, which, taken together, are a simplified illustration of a rechargeable hydrogen-fueled vehicle 50. The vehicle 50 is propelled by electric motors 52 and preferably comprises an electricity generating system, preferably comprising at least one hydrogen generator 54 and at least one fuel cell 56 to supply electric power to the electric motors 52. In FIG. 3A a depleted hydrogen generator 54, here specifically designated by numeral 60, is shown being removed from the vehicle. In FIG. 3B, a recharged hydrogen generator 54, here specifically designated by numeral 62, is shown being installed in the vehicle 50 while the depleted hydrogen generator 60 is shown being connected to a recharging device 64 to be recharged.

In FIGS. 3A and 3B the hydrogen generators 54 are suitable for electrical recharging, the recharging device 64 is an electric power supply and the recharging is electrical recharging. It is appreciated that alternatively or additionally the hydrogen generator 54 may be suitable for hydrogen recharging. In this case the recharging device 64 is a hydrogen supplying tank and the recharging of the depleted hydrogen generators 54 is performed by supplying hydrogen to cathodes of the hydrogen generator 54.

It is appreciated that a hydrogen-powered engine (not shown) can be used instead of the fuel cells 56 and the electric motors 52. The hydrogen-powered engine may comprise a spark-ignited engine, a diesel engine or a turbine engine. It is also appreciated that the vehicle 50 can be a car, a train, a vessel, an airplane or any other means of transportation.

It is appreciated that electric power for electrical recharging the hydrogen generator 54 can also be provided from solar cells 58. The solar cells 58 can be installed on top of the vehicle 50 and electrically connected to the hydrogen generator 54 or can be installed at the recharging station and electrically connected to the hydrogen generator recharging device 64.

It is appreciated that some electric power for electrical recharging of the hydrogen generator 54 can be provided by regenerative braking when electricity is generated by the at least one electric engines 52 when operative to provide braking power.

It is appreciated that electrical recharging can be applied to one hydrogen generator 54 while other hydrogen generators are operative to produce hydrogen to propel the rechargeable hydrogen-fueled vehicle 50.

Reference is now made to FIGS. 4A, 4B and 4C, which, taken together, are a simplified illustration of a rechargeable hydrogen-fueled vehicle 70 and a system for replacing solid anodes therein, which are suitable for electrical recharging. The vehicle 70 is propelled by electric motors 72 and comprises an electricity generating system including at least one hydrogen generator 74 and at least one fuel cell 76 which supply electric power to the electric motors 72. The hydrogen generator comprises removable and replaceable anodes 78.

In FIG. 4A a depleted anode 78, here specifically designated by numeral 80, is shown being removed from the hydrogen generator 74. In FIG. 4B the depleted anode 80 is shown being recharged in a recharging device 82 and water 84 is shown being added to the hydrogen generator 74 to replenish the water supply therein. In FIG. 4C a recharged anode 86 is shown being installed in the hydrogen generator 74.

The recharging device 82 preferably comprises an electrical power supply, electrically connected to sockets 88 that are adapted to connect, mechanically and electrically, to recharging anodes 78. As noted hereinabove, the recharging is electrical recharging. In the recharging device 82 the recharging anodes 78 are immersed in electrolyte opposite inert counter electrodes (not shown). The recharging employs a DC electric current wherein a negative terminal of a power supply is connected to the recharging anodes 78 and a positive terminal of the power supply is connected to the counter electrode. A suitable recharging controller contained within recharging device 82 may employ time measurements, voltage measurements, current measurements or any other suitable measurement, to terminate recharging when the anodes 78 are sufficiently recharged.

Alternatively the anodes of the hydrogen generator 74 may be suitable for hydrogen recharging. In this case the recharging device (not shown) preferably comprises a hydrogen tank, preferably connected to a plurality of hermetically closed compartments, wherein each compartment has a socket adapted to receive an anode of a hydrogen-rechargeable hydrogen generator.

It is appreciated that alternatively the depleted anodes 78 can be sent for processing at a remote site.

It is further appreciated that a hydrogen-powered engine (not shown) can be used instead of the fuel cells 76 and the electric motors 72. The hydrogen-powered engine may comprise a spark-ignited engine, a diesel engine or a turbine engine. It is also appreciated that the vehicle 70 can be a car, a train, a vessel, an airplane or any other means of transportation.

It is appreciated that electric power for electrical recharging of the anodes 78 of the hydrogen generator 74 can also be provided by solar cells 90. The solar cells 90 can be installed on top of the vehicle 70 and connected to the hydrogen generator 74 or located at a fixed location at the recharging station and connected to the anode-recharging device 82.

It is appreciated that some electric power for electrical recharging of the hydrogen generator 74 can be provided by regenerative braking when electricity is generated by the at least one electric motor 72 when operative to provide braking power.

It is appreciated that electrical recharging can be applied to one hydrogen generator 74 while other hydrogen generators 74 are operative to produce hydrogen to propel the rechargeable hydrogen-fueled vehicle 70.

Figure 5A:
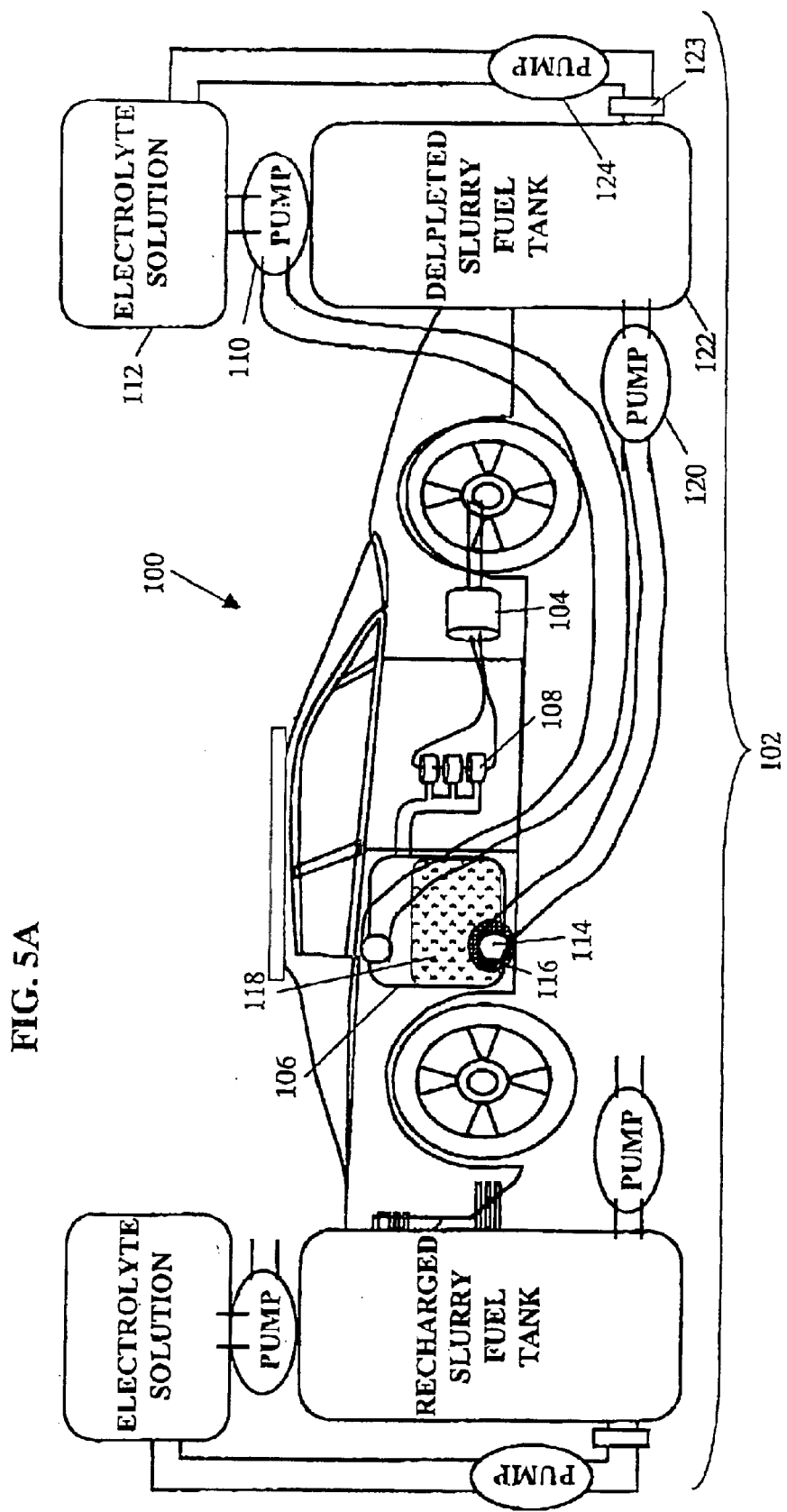
FIGS. 5A and 5B taken together are a simplified illustration of a preferred embodiment of a refuelable hydrogen-fueled vehicle and a liquid anode replacement system therefor.
Figure 5B:
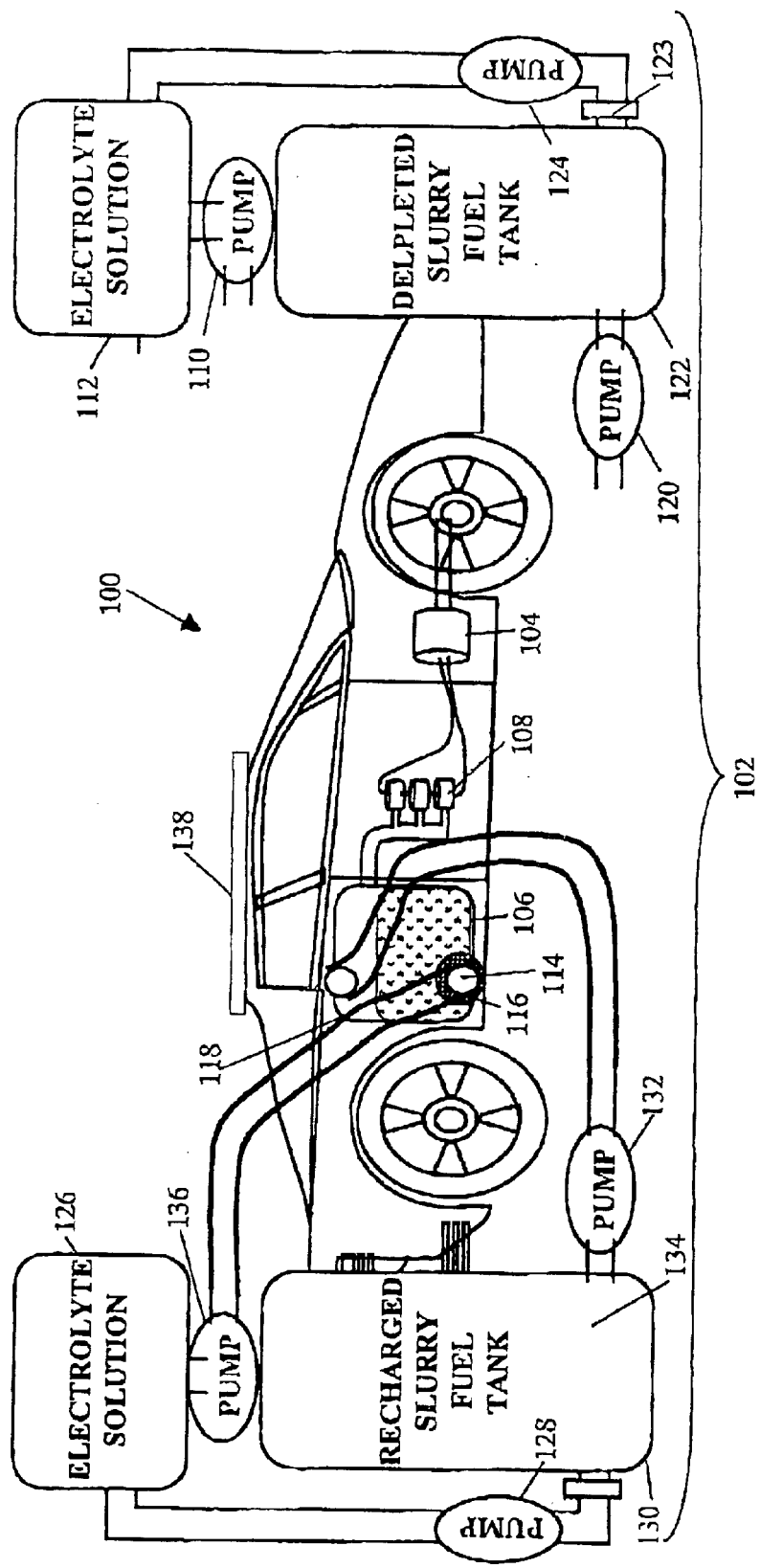

Reference is now made to FIGS. 5A and 5B, which, taken together, are a simplified illustration of a rechargeable hydrogen-fueled vehicle 100 and a slurry fuel recharging system 102 for use therewith. The vehicle 100 is propelled by electric motors 104 and comprises an electricity generating system including at least one hydrogen generator 106 and at least one fuel cell 108 supplying electric power to the electric motors 104.

In FIG. 5A, an electrolyte solution is shown being pumped by pump 110 from an electrolyte solution tank 112 to the hydrogen generator 106. A drain exit valve 114 and a drain filter 116 of the hydrogen generator 106 are open. Depleted slurry fuel 118 is forced out of the hydrogen generator 106 and is pumped by a pump 120 to a depleted slurry fuel tank 122, where water can be added thereto. Some electrolyte solution is filtered from the slurry fuel tank 122 by filter 123 and is pumped by a pump 124 back to the electrolyte solution tank 112.

In FIG. 5B, an electrolyte solution from an electrolyte solution tank 126 is pumped by pump 128 into a recharged slurry fuel tank 130. A pump 132 pumps the recharged slurry fuel 134 into the hydrogen generator 106. The drain exit valve 114 of the hydrogen generator 106 is open and the drain filter 116 is closed. Therefore the recharged slurry fuel 134 remains in the hydrogen generator 106 while any excess electrolyte solution is recycled by a pump 136 back to the electrolyte solution tank 126.

It is appreciated that a hydrogen-powered engine (not shown) can be used instead of the fuel cells 108 and the electric engines 104. The hydrogen-powered engine may comprise a spark-ignited engine, a diesel engine or a turbine engine. It is also appreciated that the vehicle 100 can be a car, a train, a vessel, an airplane or any other means of transportation.

It is also appreciated that electric power for electrical recharging of the slurry fuel can also be provided by solar cells 138. The solar cells 138 can be installed on top of the vehicle 100 and connected to the hydrogen generator 106 or can be located elsewhere at the recharging station and connected to the recharging slurry fuel tanks 122 and 130.

It is further appreciated that some electric power for electrical recharging of the hydrogen generator 106 can be provided by regenerative braking when electricity is generated by the at least one electric engines 104 when operative to provide braking power.

It is additionally appreciated that electrical recharging can be applied to one hydrogen generator of the at least one hydrogen generator 106 while other hydrogen generators of the at least one hydrogen generator 106 are operative to produce hydrogen to propel the rechargeable hydrogen-fueled vehicle 100.

Figure 6A:
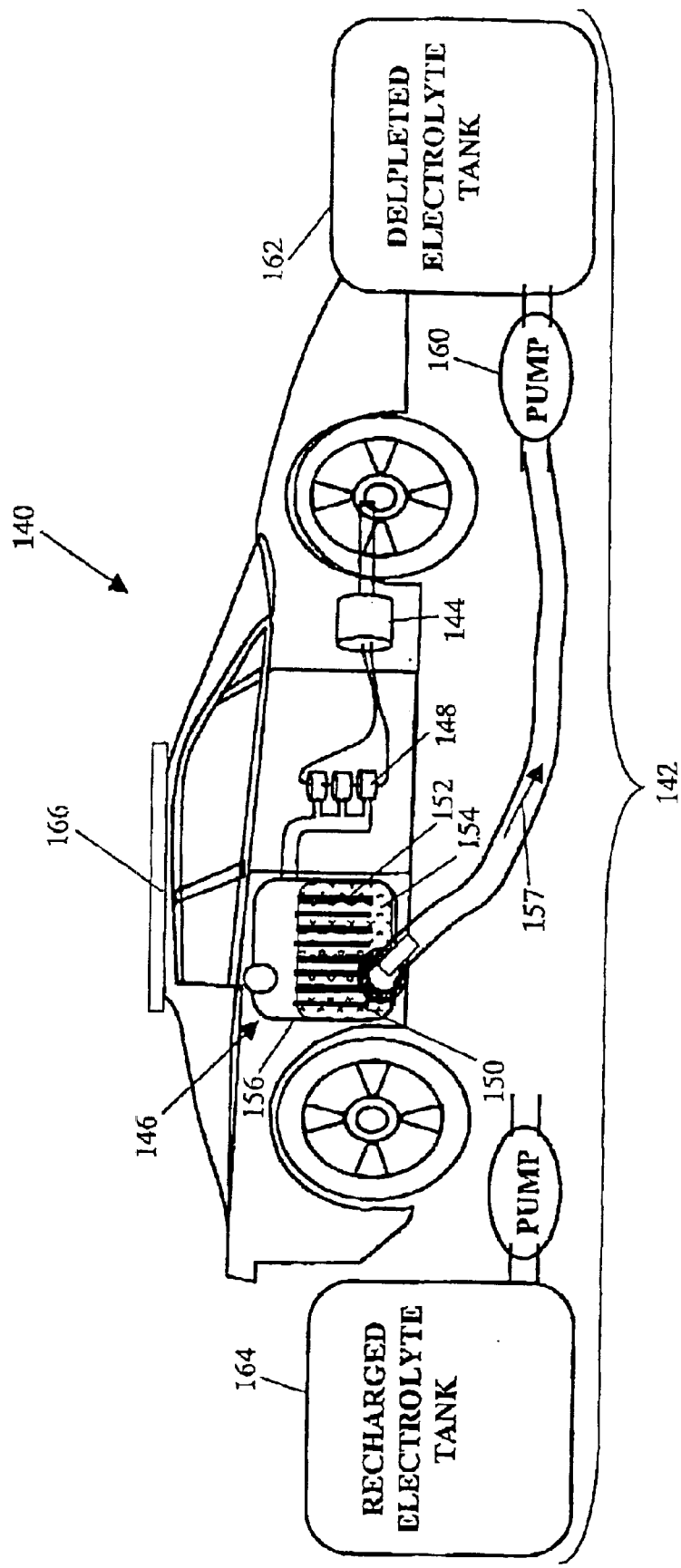
FIGS. 6A and 6B taken together are a simplified illustration of a preferred embodiment of a refuelable hydrogen-fueled vehicle and an electrolyte replacement system therefor.
Figure 6B:
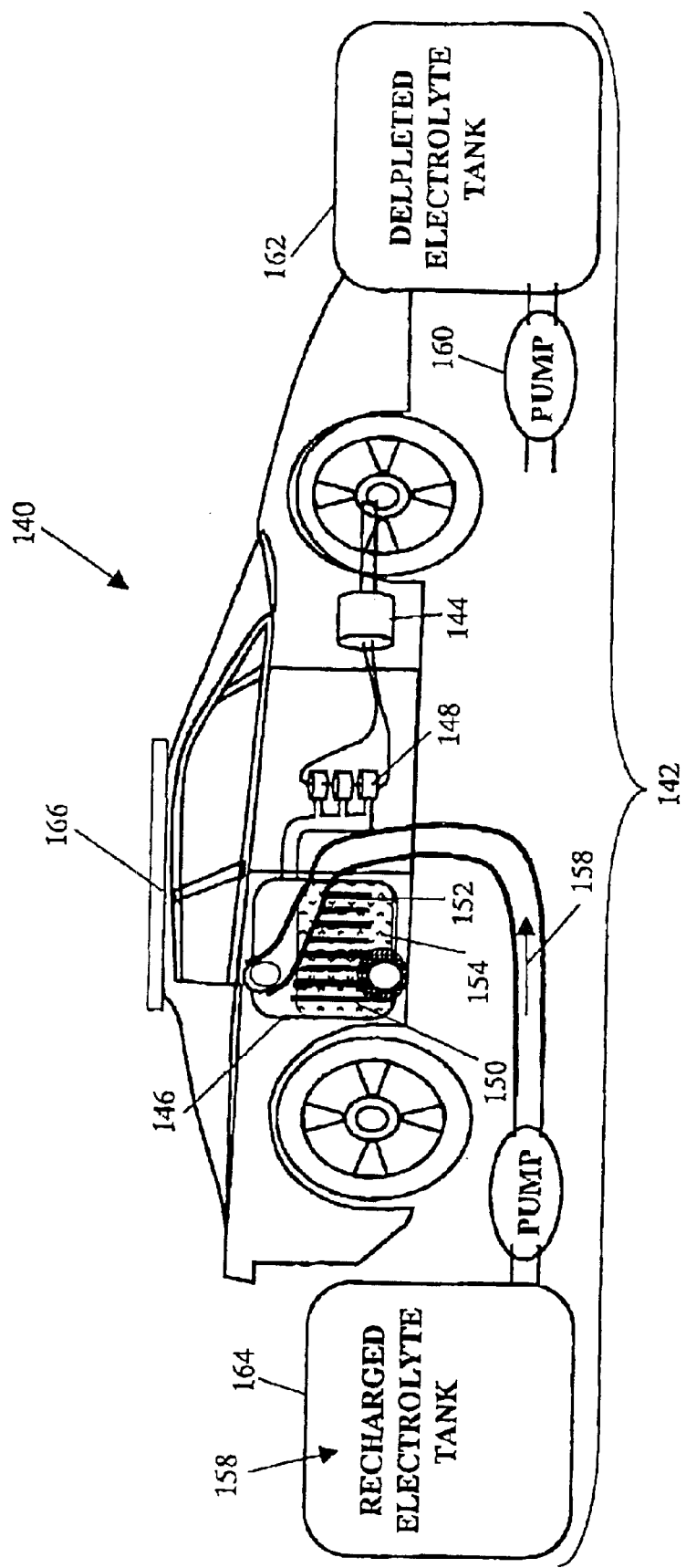

Reference is now made to FIGS. 6A and 6B, which, taken together, are a simplified illustration of a preferred embodiment of a refuelable hydrogen-fueled vehicle 140 and an electrolyte replacement system 142 therefore.

The vehicle 140 is propelled by electric motors 144 and comprises an electricity generating system including at least one hydrogen generator 146 and at least one fuel cell 148 supplying electric power to the electric motors 144.

The at least one hydrogen generator 146 comprises at least one anode 150 and at least one cathode 152 and an electrolyte 154 in a container 156. The anode 150 preferably comprises a slowly consumed material and the electrolyte 154 preferably comprises relatively quickly consumed material. Therefore the electrolyte is frequently replaced by draining the depleted electrolyte, as shown in FIG. 6A, by pumping the depleted electrolyte 157 to a depleted electrolyte tank 162 and replacing it with a fresh electrolyte 158 from electrolyte tank 164, as shown in FIG. 6B. Less frequent recharging is performed by replacing the depleted hydrogen generator, as shown and described with respect to FIGS. 3A–3B above, or by replacing depleted anodes 150, as shown and described with respect to FIGS. 4A–4C above.

Typically, the at least one anode 150 comprises at least one of aluminum and aluminum alloy in the form of a plate, or an inert current collector, preferably comprising steel, in contact with at least one of aluminum and aluminum alloy in the form of slurry. Typically the at least one cathode 152 preferably comprising at least one of a nickel-based and a titanium based cathode. Typically the electrolyte 154 comprises at least one of an alkaline electrolyte preferably based on potassium hydroxide solution and a halide electrolyte preferably based on aluminum chloride solution.

Control of the rate at which hydrogen is generated by the hydrogen generator 146 can be by at least one of:

Electrical control, preferably as described hereinbelow with reference to FIG. 12;

Electrolyte 154 level control, preferably as described hereinbelow with reference to FIG. 12; and Solid catalyst control, preferably as described hereinbelow with reference to FIG. 11.

In a preferred implementation of the present invention each fill of the electrolyte 154 in the hydrogen generator is employed to only partially dissolve the anode 150, producing a soluble product, typically potassium aluminate. The anode is thereafter replaced before an insoluble product, typically aluminum hydroxide, is formed.

In a preferred implementation of the present invention the depleted electrolyte 154, typically rich in dissolved aluminate, is removed from the hydrogen generator 146 via pump 160 into the depleted electrolyte tank 162. In the depleted electrolyte tank 162 the aluminum hydroxide is typically precipitated, preferably as a filter cake, which is periodically removed from the depleted electrolyte tank 162. Thus the original electrolyte, typically a strong alkali solution, is regenerated and transferred to a recharged electrolyte tank 164 for reuse in the hydrogen generator 146.

$KAl(OH)_4 = Al(OH)_3 + KOH$

The accumulated filter cake is sent for recycling to reform aluminum anode material at a central aluminum recovery facility.

After several refills with electrolyte in the hydrogen generator the anodes 150 are depleted and are mechanically replaced.

It is appreciated that a hydrogen-powered engine (not shown) can be used instead of the fuel cells 148 and the electric engines 144. The hydrogen-powered engine may comprise a spark-ignited engine, a diesel engine or a turbine engine. It is also appreciated that the vehicle 140 can be a car, a train, a vessel, an airplane or any other means of transportation.

Alternatively the anode 150 comprises at least one of zinc, tin, and alloys thereof. In this case electrical recharging of the anode 150 is possible.

It is appreciated that electric power for electrical recharging of the anode 150 can also be provided by solar cells 166. The solar cells 166 can be installed on top of the vehicle 140 and connected to the hydrogen generator 146.

It is appreciated that some electric power for electrical recharging of the hydrogen generator 146 can be provided by regenerative braking when electricity is generated by the electric motors 144 when operative to provide braking power.

Figure 7:
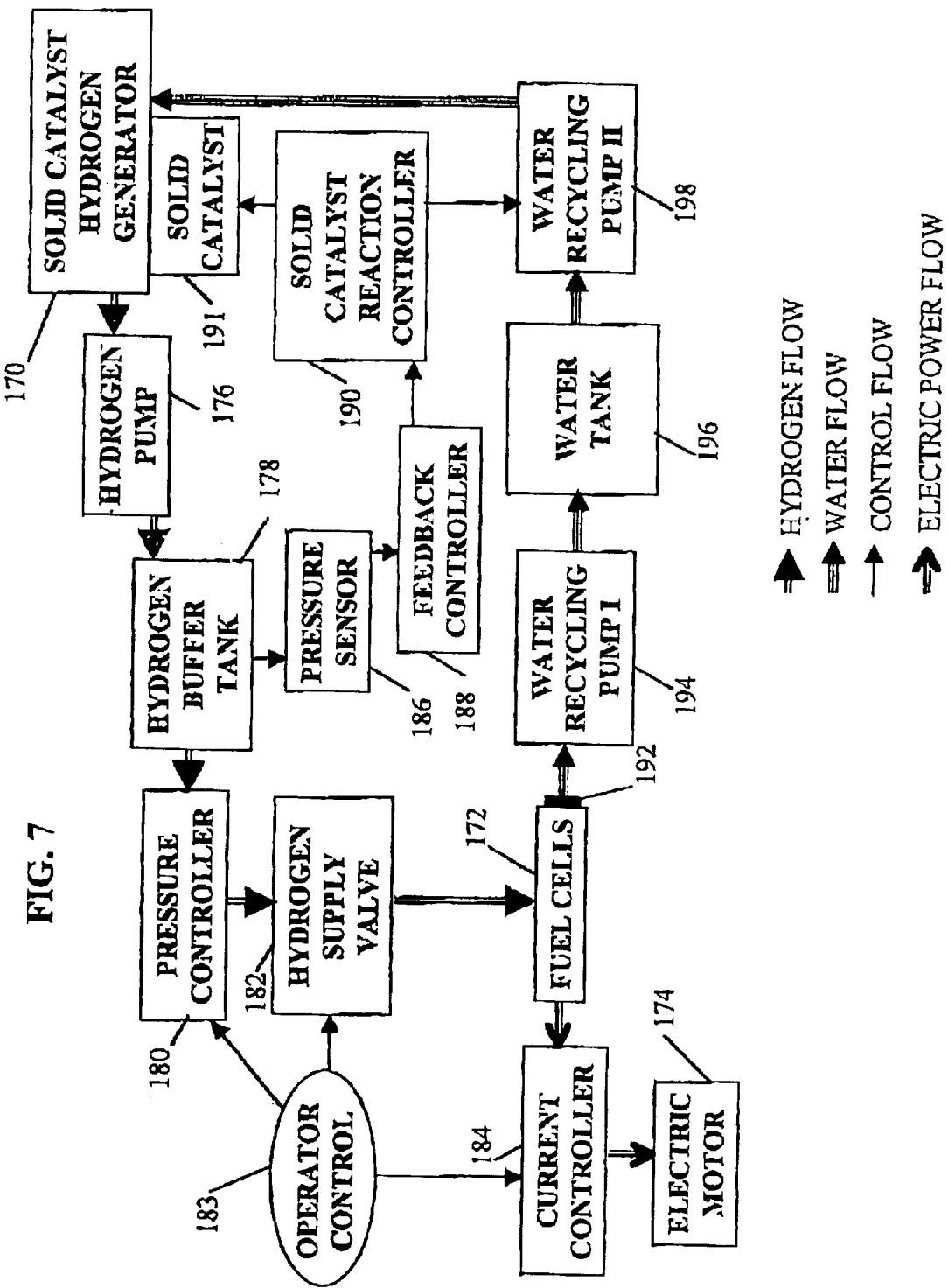
FIG. 7 is a simplified block diagram of a preferred embodiment of a refuelable hydrogen-fueled vehicle propulsion system comprising an electric motor and a solid catalyst control subsystem for controlling the rate of hydrogen generation.

Reference is now made to FIG. 7, which is a simplified block diagram of a preferred implementation of a refuelable, hydrogen-fueled, vehicle propulsion system. The vehicle propulsion system of FIG. 7 comprises at least one solid catalyst hydrogen generator 170 which supplies hydrogen to fuel cells 172, The fuel cells 172 produce electrical power for at least one electric motor 174. In a preferred embodiment of the present invention, the hydrogen produced by the hydrogen generator 170 is pumped by a hydrogen pump 176 into a hydrogen buffer tank 178. A pressure controller 180 and a hydrogen supply valve 182 are employed by a vehicle operator 183 to determine the amount of hydrogen that is delivered to the fuel cells 172.

The electrical power produced by the fuel cells 172 is provided directly, or alternatively via an electric current controller 184, to the at least one electric motor 174. The vehicle operator 183 controls at least one of the pressure controller 180, the hydrogen supply valve 182 and the current controller 184 to determine the amount of power that is produced by the propulsion system.

Preferably a pressure sensor 186 measures the pressure of hydrogen gas inside the hydrogen buffer tank 178. The output of the pressure sensor 186 is preferably connected to the input of a feedback controller 188 whose output is supplied to a reaction controller, preferably a solid catalyst reaction controller 190. Thus the rate of production of hydrogen by the hydrogen generator 172 may be controlled according to the hydrogen gas pressure in the hydrogen buffer tank 178.

The reaction controller 190 may be an electromechanical reaction controller, controlling the introduction of a solid catalyst driving mechanism 191 into the fuel of the hydrogen generator 170 as will be described hereinbelow with respect to FIG. 11. Alternatively, the reaction controller 190, may be an electrical reaction controller, controlling the electric current produced by the hydrogen generator 170, as will be described hereinbelow with respect to FIGS. 12 and 13.

In a preferred implementation of the present invention water produced from the fuel cells 172 is collected and filtered through a filter 192 and preferably is pumped by a first water recycling pump 194 into a water buffer tank 196. Preferably, a second water recycling pump 198, under the control of the reaction controller 190, pumps the water into the hydrogen generator 170 to replace the water that the hydrogen generator 170 uses to produce hydrogen.

Hydrogen generator 170 may be recharged typically by employing at least one of the following six methodologies:

(a) In accordance with one preferred embodiment of the present invention, recharging is performed as shown and described hereinabove with respect to FIG. 1 by supplying hydrogen gas to a suitable hydrogen generator, such as that described hereinbelow with respect to FIG. 13.

In this embodiment the hydrogen generator comprises at least one hydrophobic cathode, preferably employing a Teflon coating, layer or binder. This cathode is preferably a bifunctional cathode, constructed so to enable the possibility of its operation, in installments, as a hydrogen-generating and as a hydrogen-consuming electrode.

Recharging preferably is performed by initially providing an electrical connection between the anode and the cathode of the hydrogen generator and by then providing hydrogen gas to the cathode. The hydrogen reaction at the cathode causes a depleted anode to be reduced so that the original composition of the anode is reconstituted and water is produced. It is appreciated that additional water may be added to the hydrogen generator 170, or alternatively to the water tank 196.

(b) In accordance with another preferred embodiment of the present invention, recharging is performed as shown and described with respect to FIG. 2 by supplying electrical current to electrodes of a suitable hydrogen generator such as that shown and described below with respect to FIGS. 12 and 13.

Recharging can be performed by replenishing water and applying an electric current from an external DC power supply to the anode and cathode of the hydrogen generator to reconstitute in situ the original composition of the anode.

(c) In accordance with yet another preferred embodiment of the present invention recharging is performed as described hereinabove with respect to FIGS. 3A–3C by removing the depleted hydrogen generator and replacing it with a new or recharged hydrogen generator Thereafter the recharging of the depleted hydrogen generator is performed preferably electrically in a recharging device in accordance with the electrical recharging described above. Alternatively the recharging of the depleted hydrogen generator is performed by supplying hydrogen in a recharging device in accordance with the hydrogen recharging described above.

Alternatively the depleted hydrogen generator is removed from the vehicle, the anodes are removed from the depleted hydrogen generator and are replaced by new or recharged anodes and the depleted anodes are sent for processing at a remote site. Optionally the electrolyte is replaced with fresh electrolyte.

(d) In accordance with still another preferred embodiment of the present invention recharging is performed as described hereinabove with respect to FIGS. 4A–4C by removing the depleted anode from the hydrogen generator and replacing it with a new or recharged anode and either replacing the electrolyte with fresh electrolyte or replenishing the water in the electrolyte or in the hydrogen generator 170. Thereafter the recharging of the depleted anode is performed, preferably electrically, in a recharging device in accordance with the electrical recharging described above. Alternatively the recharging of the depleted anode is performed by supplying hydrogen in a recharging device in accordance with the hydrogen recharging described above. As a further alternative, the depleted anode is sent for processing at a remote site.

(e) In another preferred embodiment of the present invention the anode is made of a slowly consumed material and the electrolyte comprises a relatively quickly consumed material. In this case, frequent recharging is performed by replacing the depleted electrolyte with a fresh electrolyte, as shown and described with respect to FIGS. 6A and 6B above. Less frequent recharging is performed by replacing the depleted hydrogen generator, as shown and described with respect to FIGS. 3A–3B above, or by replacing the depleted anode, as shown and described with respect to FIGS. 4A–4C above.

(f) In accordance with yet another preferred embodiment of the present invention the anode comprises slurry fuel as will be described below with respect to FIGS. 11 and 13. In this case, recharging is performed by draining the depleted slurry fuel from the hydrogen generator and replacing it with a new or recharged slurry fuel and replenishing water solution in the hydrogen generator as shown and described with respect to FIGS. 5A and 5B above. Recharging of the depleted slurry fuel is thereafter performed, preferably electrically, in a slurry fuel recharging device in accordance with the electrical recharging described above. Alternatively the recharging of the depleted slurry fuel is performed by supplying hydrogen in a recharging device in accordance with the hydrogen recharging described above.

It is appreciated that the hydrogen generator may be operated for recharging by various methodologies. For example, to enable electrical recharging at home and anode replacement or slurry fuel replacement in a recharging station.

It is appreciated that other electrical appliances can be operated, as well as more than one electric motor, using the electric current provided by the at least one fuel cells. However, for sake of simplicity only one electric motor is shown.

The table below summarizes the use of various chemicals in accordance with respective preferred embodiments of the present invention:

The following is a preferred fuel cell reaction that produces water, which is optionally fed, at least in part, back to the hydrogen generator reaction, thus saving system weight and volume:

$$2H_2 + O_2 = 2\ H_2O$$

Figure 8:
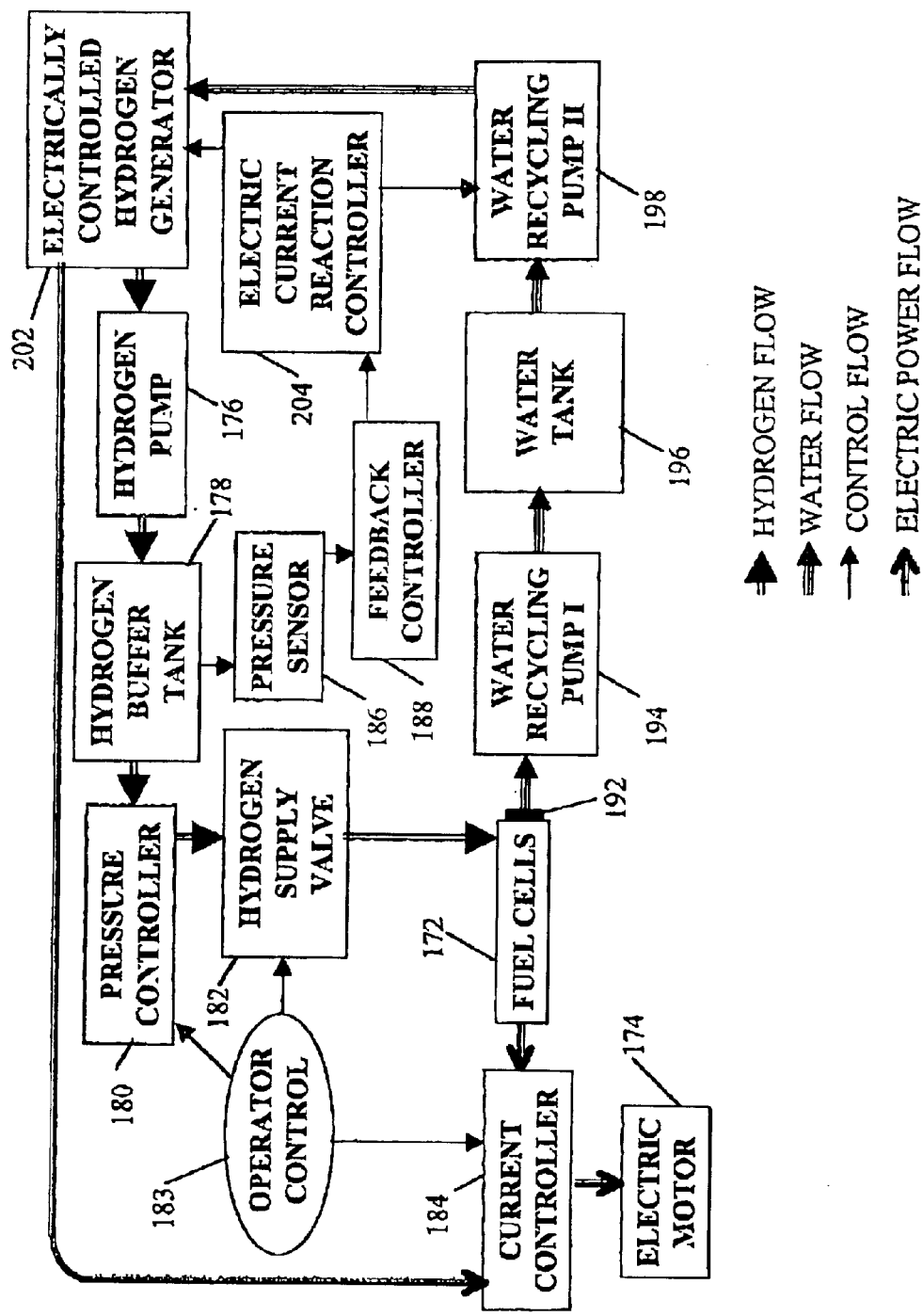
FIG. 8 is a simplified block diagram of a preferred embodiment of a refuelable hydrogen-fueled vehicle propulsion system comprising an electric motor and an electrical control subsystem for controlling the rate of hydrogen generation.

Reference is now made to FIG. 8, which is a simplified block diagram of another preferred implementation of a refuelable, hydrogen-fueled, vehicle propulsion system. FIG. 8 is similar to FIG. 7 however in FIG. 8 the hydrogen generator 202 is of the type that also produces electrical power, such as the hydrogen generators shown and described with reference to FIGS. 12 and 13 below. In FIG. 8 the electric output from the hydrogen generator 202 is connected to the current controller 184 and the electric power from the fuel cells 172 and from the hydrogen generator 202 is applied, via the controller 184, to the electric motor 174. An electric current reaction 204 controller receives a feed-back signal from the feed-back controller 188 and accordingly determines the electric current flowing through the electrically controlled hydrogen generator 202. Alternatively, the current controller operates the second water recycling pump 198 to set the amount electrolyte in the hydrogen generator 202. Both methods determine the amount of hydrogen produced by the hydrogen generator 202

Figure 9:
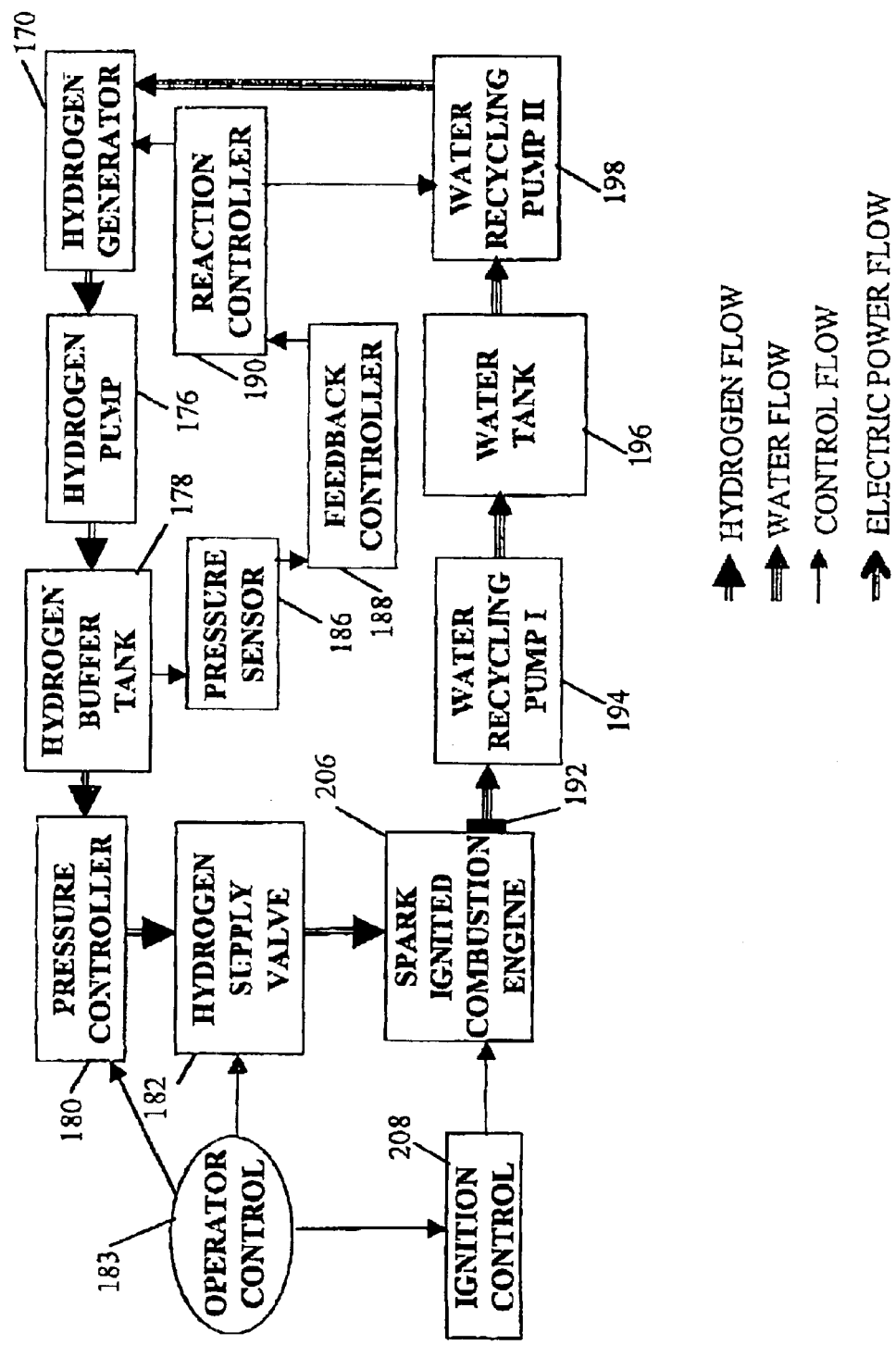
FIG. 9 is a simplified block diagram of a preferred embodiment of a refuelable hydrogen-fueled vehicle propulsion system comprising a hydrogen consuming spark ignited internal combustion engine.
Figure 10:
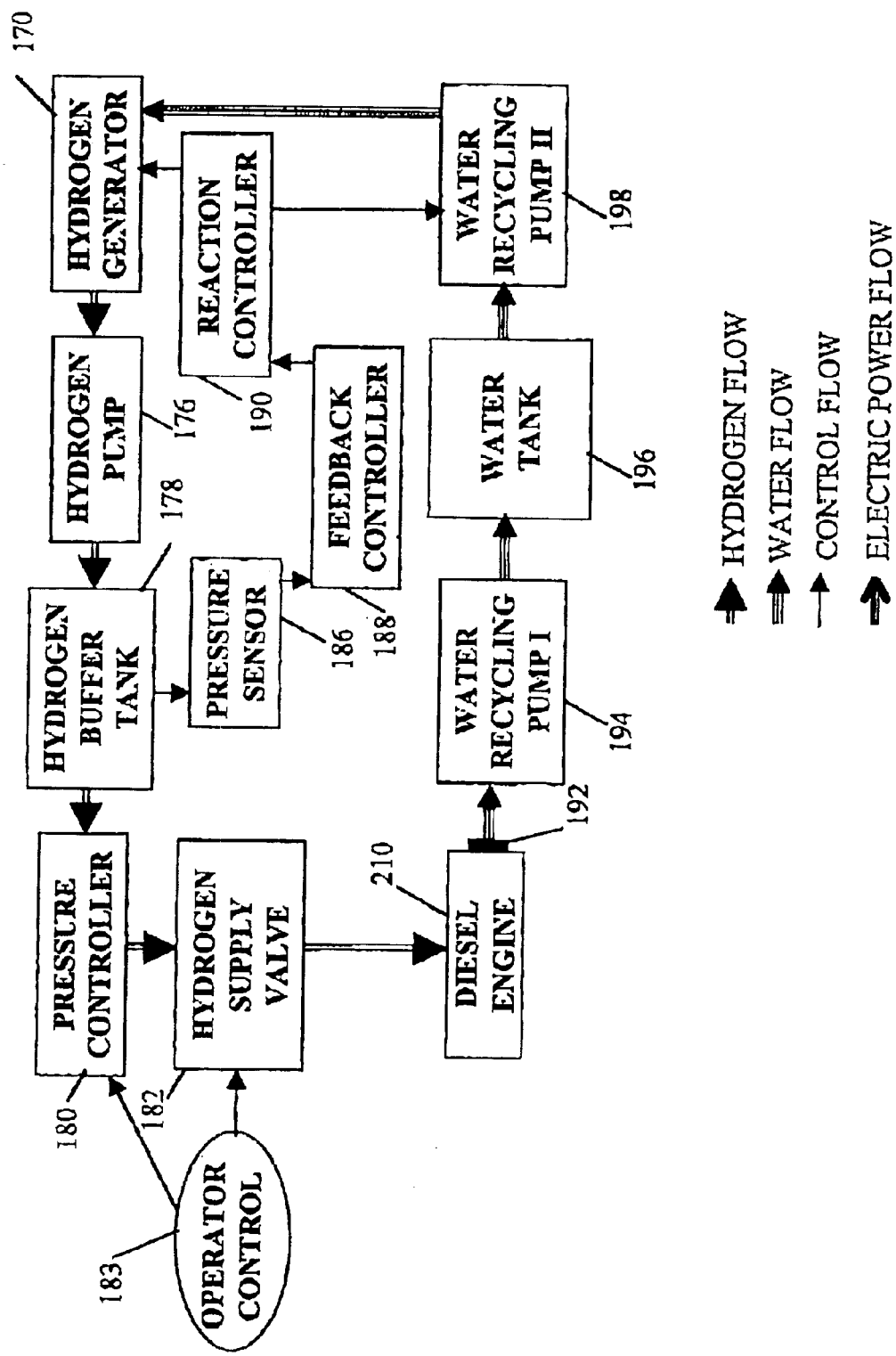
FIG. 10 is a simplified block diagram of a preferred embodiment of a refuelable hydrogen-fueled vehicle propulsion system comprising hydrogen consuming diesel engine.

Reference is now made to FIGS. 9 and 10, which are simplified block diagrams of two other preferred implementations of the refuelable, hydrogen-fueled, vehicle propulsion system employing an internal combustion engine. In FIG. 9 a hydrogen-powered engine 206 is a spark ignited hydrogen-powered engine and an element 208 provides the spark to ignite the gas mixture in the hydrogen-powered engine 206. In FIG. 10 a hydrogen-powered engine 210 is a diesel engine.

Figure 11:
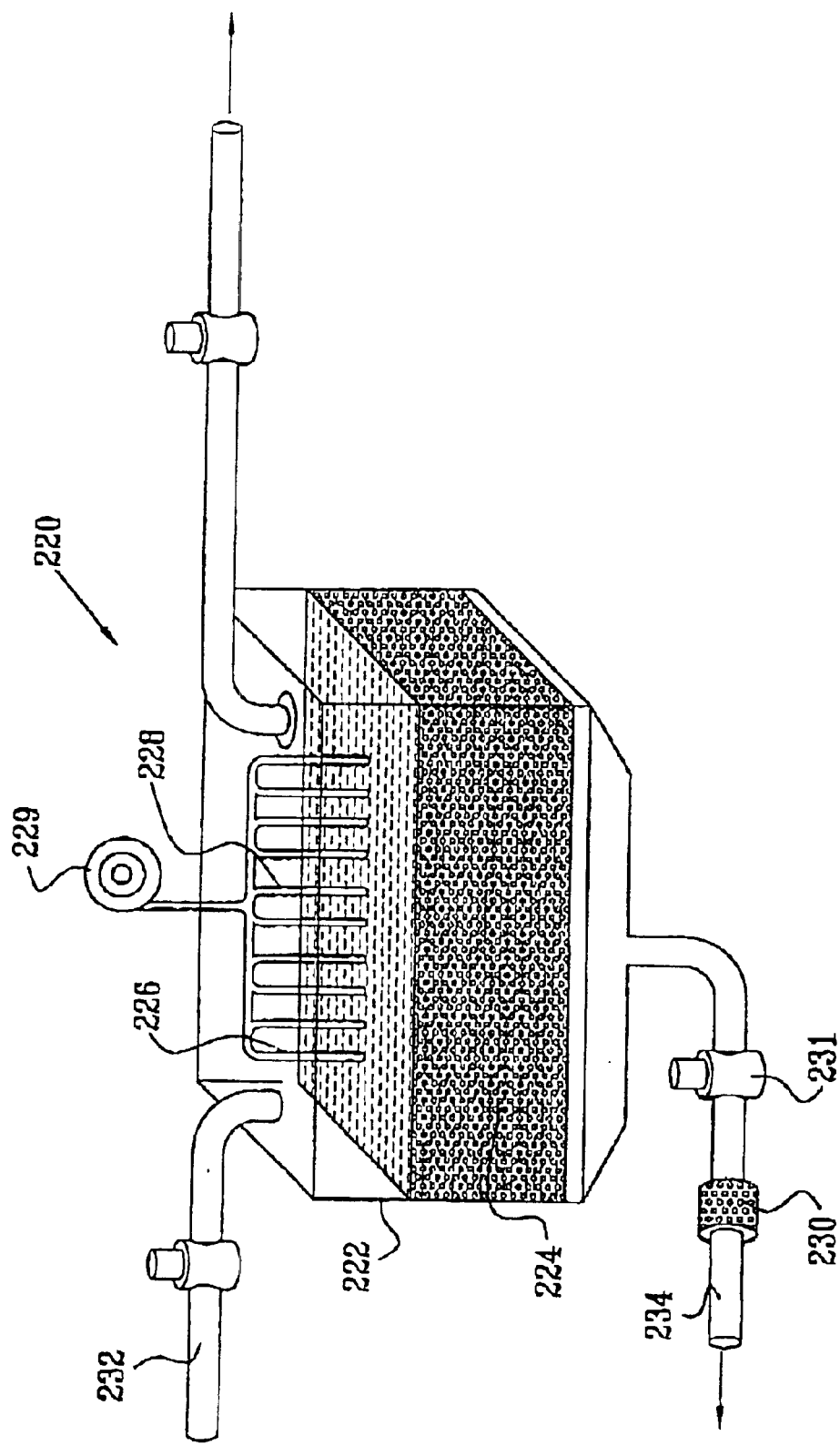
FIG. 11 is a simplified illustration of a preferred embodiment of a rechargeable hydrogen generator employing slurry fuel and a solid catalyst control subsystem, which is useful in the propulsion system described in FIG. 7 and in the recharging systems of FIGS. 5A–6B.

Reference is now made to FIG. 11, which is a simplified illustration of a preferred implementation of a rechargeable hydrogen generator employing slurry fuel and a solid cata-

| Metal in Fuel | Form of Fuel | FIGS. | Recharge Methodology | FIGS. | |
|---|---|---|---|---|---|
| Ca, Al, Mg, Na, Li And their alloys | Solid Anode or Slurry | 11, 13 | mechanical replacement | (b), (c), (e), (f) | 3A–3B, 4A–4C 5A–5B |
| Fe, Cd, And metal Alloy hydrides | Solid Anode or Slurry | 11, 12, 13 | hydrogen recharging, electrical recharging, mechanical replacement | (a), (b), (c), (e), (f) | 1, 2, 3A–3B, 4A–4C, 5A–5B, 6A–6B |
| Sn, Pb, Zn And their alloys | Solid anode or Slurry | 11, 12, 13 | mechanical replacement, electrical recharging | (b), (c), (e), (f) | 2, 3A–3B, 4A–4C, 5A–5B, 6A–6B |

The following preferred reaction for a divalent metal anode such as iron produces hydrogen in a preferred electrochemical setup and forms iron hydroxide as a by-product:

$$Fe + 2H_2O = Fe(OH)_2 + H_2$$

It is appreciated that a similar preferred reaction is effective for magnesium.

The following preferred reaction for zinc produces zinc oxide rather than hydroxide, typically in alkali:

$$Zn + H_2O = ZnO + H_2$$

The following is preferred reaction for aluminum, which is trivalent:

$$Al + 3\ H_2O = Al(OH)_3 + 1.5\ H_2$$

lyst control subsystem in accordance with the propulsion system shown and described in FIG. 6 and also in accordance with the slurry fuel recharging system shown and described in FIGS. 5A and 5B.

As seen in FIG. 11, there is provided a hydrogen generator, designated generally by reference numeral 220, which preferably comprises a container 222 in which is disposed:

a water-based fuel 224 including either:
        a salt selected from a group consisting of halides, trihalides, acetates, sulfates, nitrates, borates, acid salts, chromate, stannate, perchlorate and basic salts of Group I metals, ammonium, Group II metals and Group III metals; or a base; or an acid, as well as at least one of zinc, iron, aluminum, magnesium, tin, calcium, lithium, sodium, metal hydrides based on nickel or titanium or rare earth metals, or alloys thereof, and a catalyst 226, preferably based on at least one of a metal or metal oxide belonging to the platinum metal group or the transition metal group.

In the embodiment of FIG. 11, the catalyst 226 may be formed as a coating on at least one rod 228, which may be introduced, by mechanism 229, to a selectable extent into the water based fuel 224.

In accordance with a preferred embodiment of the present invention, the water-based fuel 224 includes zinc and the catalyst 226 may also comprise an impurity in the zinc. The impurity is preferably a transition metal.

As a further alternative, the water-based fuel 224 includes iron and the catalyst 226 may also comprise an impurity in the iron which impurity preferably is a transition metal apart from iron.

In accordance with a preferred embodiment of the present invention, the base may comprise a hydroxide of potassium, sodium or lithium or their mixtures preferably in solution in water.

In accordance with another preferred embodiment of the present invention, the acid may comprise inorganic acid such as sulfuric acid, preferably in aqueous solution, or an organic acid such as citric acid, preferably in aqueous solution.

In accordance with yet another preferred embodiment of the present invention, the at least one of zinc, iron, aluminum, magnesium, tin, calcium, lithium, sodium, metal hydrides based on nickel or titanium or rare earth metals, or alloys thereof is disposed in the water based fuel as a powder, granules or coated particles, hereinafter designated as slurry fuel. The slurry fuel, can be replaced to recharge the hydrogen generator.

To drain the depleted slurry fuel 224, a filter 230 and a drain valve 231 are opened, electrolyte is forced through a first pipe 232 and the slurry fuel is drained through a second pipe 234 until the container 222 is emptied from the depleted slurry fuel 224.

To fill recharged slurry fuel 224, the filter 230, which is porous to electrolyte but not to the slurry fuel, is closed, and recharged slurry fuel is forced via entry pipe 232. The excess electrolyte that is used to transport the slurry fuel is drained thorough the filter 230 and the exit pipe 234.

Figure 12:
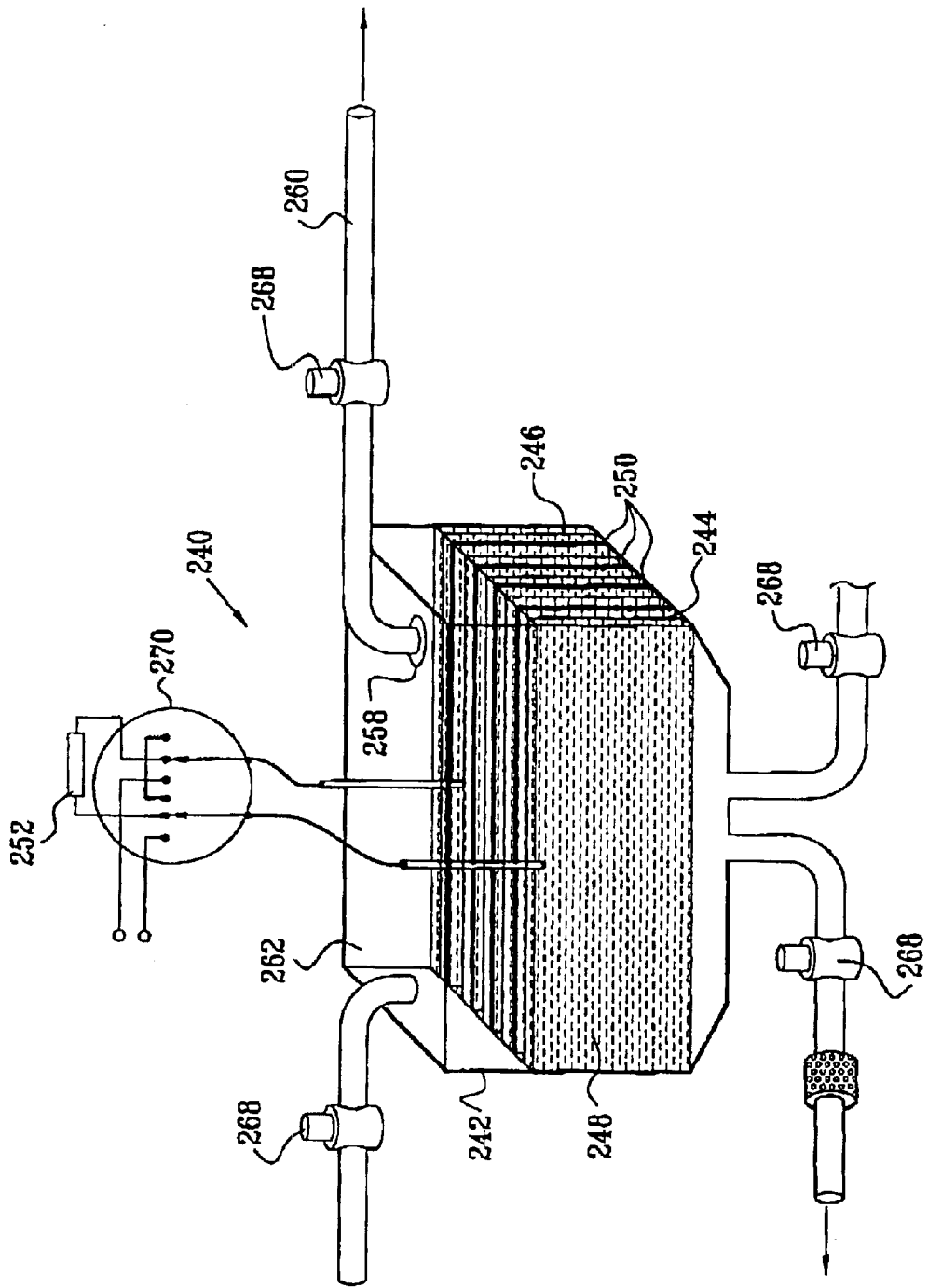
FIG. 12 is a simplified illustration of a preferred embodiment of a rechargeable hydrogen generator including an electrical control subsystem, useful in the propulsion system shown in FIG. 8 and in the embodiment of FIG. 2.

Reference is now made to FIG. 12, which is a simplified illustration of a rechargeable hydrogen generator in accordance with the methodologies of electrical recharging and of recharging by anode replacement described above and as shown and described with reference to FIG. 2 and to FIGS. 4A–4C.

As seen in FIG. 12, there is provided a hydrogen generator, designated generally by reference numeral 240, which preferably comprises a container 242 containing at least one anode 244, at least one cathode 246, an electrolyte 248 and an optional but preferred porous separator sheet 250 separating between the anode 244 and the cathode 246. A resistance providing element 252, typically a variable resistor, is connected between the anode 244 and the cathode 246. Hydrogen gas is released, typically via a liquid impermeable filter 258, and passes via a conduit 260 through a cover 262 of container 242.

In the embodiment of FIG. 12 the rate at which hydrogen is released is proportional to the current flowing through resistance providing element 252.

Alternatively a current controller is connected between the anode 244 and the cathode 246.

As a further alternative the current controller is a pulse width modulator that provides a short circuit or a fixed resistance between the anode 244 and the cathode 246 and wherein the short circuit or the fixed resistance is provided for a controllable part of a cycle.

As a further alternative the rate of production of hydrogen gas by the hydrogen generator 240 is controlled by controlling the level of the electrolyte in the container, preferably using the water pump 264 that is electrically connected to a water level controller (not shown) and to an electrolyte tank 266.

Valves 268, preferably solenoid operated valves, are provided to seal and to control the flow of liquids and gases to and from the container 242.

An electric switch 270 is provided to connect the at least one anode 244 and the at least one cathode 246 of the hydrogen generator 240 to a resistor 252 when the hydrogen generator 240 is in a hydrogen generating mode, or to a recharging device (not shown) for electrical recharging when the hydrogen generator 240 is in an electrical recharging mode.

In a preferred implementation of the present invention the anode 244 and the cathode 246 are mechanically supported by the walls of the container 242 in a manner that enables their replacement.

In another preferred implementation of the present invention the anode 244 includes at least one of zinc, iron and tin in sheet or in plate form.

Alternatively, the anode 244 includes at least one of cadmium and lead, which are amenable to at least one of electrical recharging, anode replacement and hydrogen generator replacement.

Alternatively, the anode may include at least one of zinc, iron, lead, cadmium and tin as a pressed powder or a paste form wherein the powder or the paste is pressed on a flat support such as a sheet or a mesh. Preferably, the flat support is electrically conducting and includes an electrical terminal.

In a preferred implementation of the present invention the cathode 246 is an electrically conducting plate or an electrically conducting mesh supporting a catalyst for hydrogen production. The catalyst preferably contains material based on the platinum metal group or the transition metal group.

In a preferred implementation of the present invention the electrolyte includes at least one of salts, acids and bases, preferably in absorbed or gel form. The base may comprise hydroxides of potassium, sodium or lithium or their mixtures thereof preferably in solution in water. The acid may comprise an inorganic acid such as sulfuric acid, preferably in aqueous solution or an organic acid such as citric acid, preferably in aqueous solution.

In another preferred implementation of the present invention the hydrogen generator 240 comprises a plurality of cells wherein each cell comprises an anode 244, a cathode 246, an electrolyte 248 and an optional but preferred porous separator sheet or mesh 250 separating between the anode 244 and the cathode 246. The cells of the hydrogen generator are electrically connected in series so that an anode 244 of one cell is electrically connected the cathode of the next cell. A resistance providing device or a current controller is connected between the first anode and the last cathode of the hydrogen generator.

Alternatively, as shown in FIG. 12, the inner electrodes are formed as bipolar electrodes where the anode of a first cell is formed on one side of an electrically conducting plate and the cathode of the next cell is formed on the other side of the same electrically conducting plate.

In a preferred implementation of the present invention the container and the anodes and the cathodes are made to be easily removed from the container and replaced by a new set of anodes and cathodes.

Figure 13:
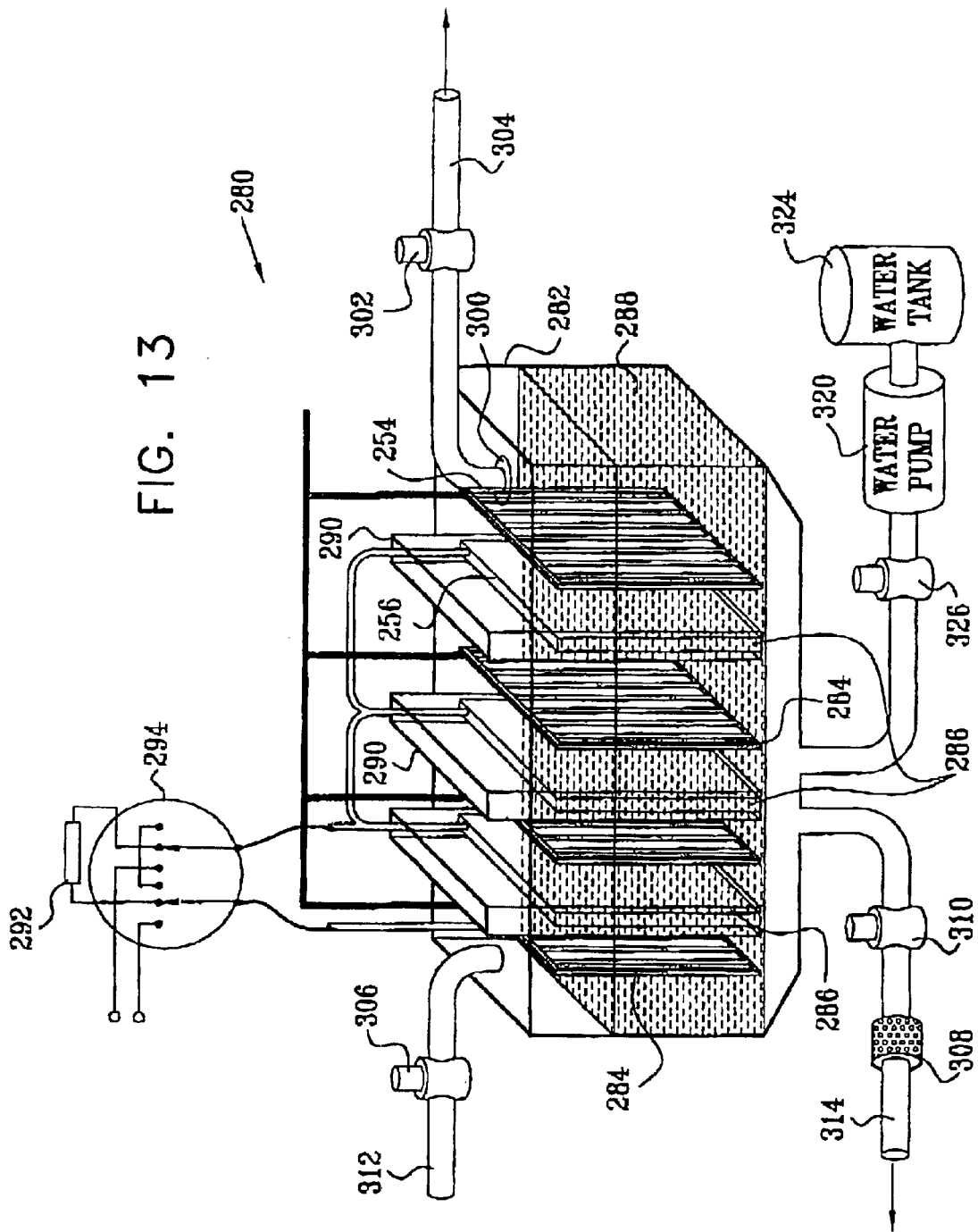
FIG. 13 is a simplified illustration of a preferred embodiment of a rechargeable hydrogen generator employing slurry fuel and an electrical control subsystem, useful in the propulsion system shown in FIG. 8 and in the embodiments of FIGS. 1 and 5A–6B.

Reference is now made to FIG. 13, which is a simplified illustration of a rechargeable hydrogen generator employing slurry fuel and an electrical control subsystem and which is useful in the propulsion system described in FIG. 8 and in the slurry fuel recharging system of FIGS. 5A and 5B.

As seen in FIG. 13, there is provided a hydrogen generator, designated generally by reference numeral 280, which preferably comprises a container 282 containing at least one anode 284, at least one cathode 286, a slurry fuel 288 and at least one porous separator 290. Each at least one cathode 286 is contained within each of the at least one porous separator 290, thus separating each cathode 286 from the slurry fuel 288. Preferably, all anodes 284 are electrically interconnected and all cathodes 286 are electrically interconnected The anodes 284 comprise an electrical conductor sheet or mesh and are in direct electrical contact with the slurry fuel 288.

The cathode 286 comprises an electrical conductor sheet or mesh and is coated with a catalyst preferably based on at least one of a metal or metal oxide belonging to the platinum metal group or the transition metal group.

The slurry fuel 288 comprises:
an electrolyte comprising either:
   a salt selected from a group consisting of halides, trihalides, acetates, sulfates, nitrates, borates, acid salts, chromate, stannate, perchlorate and basic salts of Group I metals, ammonium, Group II metals and Group III metals; or
   a base, preferably comprising hydroxides of potassium, sodium or lithium or their mixtures thereof, or
   an acid preferably comprising an inorganic acid such as sulfuric acid, or an organic acid such as citric acid,
   preferably in absorbed or gel form,
as well as at least one of zinc, iron, tin, calcium, metal hydrides based on nicker or titanium or rare earth metals, or alloys thereof disposed in the electrolyte as at least one of powder, granules and coated particles.

The separator 290 is porous to gas and to the electrolyte but not to the slurry fuel 288.

In accordance with a preferred embodiment of the present invention, the water-based slurry fuel 288 includes zinc and the catalyst may also comprise an impurity in the zinc. The impurity is preferably a transition metal.

As a further alternative, the slurry fuel 288 includes iron and the catalyst may also comprise an impurity in the iron which impurity preferably is a transition metal apart from iron.

In accordance with a preferred embodiment of the present invention, the base may comprise a hydroxide of potassium, sodium or lithium or their mixtures preferably in aqueous solution.

In accordance with another preferred embodiment of the present invention, the acid may comprise inorganic acid such as sulfuric acid, preferably in aqueous solution, or an organic acid such as citric acid, preferably in aqueous solution.

A resistance providing element 292, typically a variable resistor, is connected between the at least one anode 284 and the at least one cathode 286, via a switch 294, provided to selectably connect the at least one anode 284 and the at least one cathode 286 to the resistance providing element 292, or to an external DC power supply (not shown) for electrical recharging or to a short circuit for hydrogen recharging. The rate at which hydrogen is released by the hydrogen generator 280 is proportional to the current flowing through the resistance providing element 292

Alternatively a current controller is connected between the anode 284 and the cathode 286 instead of the resistance providing element 292.

As a further alternative the current controller is a pulse width modulator that provides a short circuit or a fixed resistance between the anode 284 and the cathode 286 and wherein the short circuit or the fixed resistance is provided for a controllable part of a time cycle.

As a further alternative the rate of production of hydrogen gas by the hydrogen generator is controlled by controlling the level, or alternatively the quantity, of the electrolyte in the container, preferably using a water pump 320 that is electrically connected to a water level controller (not shown), or alternatively to a water doser (not shown) and to a water tank 324 via a valve 326.

Hydrogen gas is released, typically via a liquid impermeable filter 300 and passes through a cover of container 282 and via a valve 302, preferably a solenoid valve, and via a conduit 304.

The water based slurry fuel can be replaced to recharge the hydrogen generator. Recharging is performed in three steps. In step I the used slurry fuel is drained from the hydrogen generator container 282. In step II recharged slurry fuel is added to the hydrogen generator container 282. In step III water solution is added to the slurry fuel 288 in the container 282.

Step I

To drain the depleted water based fuel, an entry valve 306, a filter 308 and a drain valve 310 are opened. Electrolyte, preferably, is then forced through an entry pipe 312 and the water based slurry fuel 288 is flushed through an exit pipe 314 until the container 282 is emptied.

Step II

To fill recharged water based fuel, the filter 308 is closed and recharged slurry fuel is poured via entry pipe 312. Water is used to carry the slurry fuel to the container 282. The excess water that is drained through the filter 308 and the exit pipe 314 back to the recharging system (not shown). When the container 282 is filled with required amount of slurry fuel 288 the drain valve 310 is closed.

Step III

To complete the recharging of the hydrogen generator 280 electrolyte, preferably, is added to the container 282. When the container 282 is filled with required amount of electrolyte the entry valve 306 is closed.

It is appreciated that the slurry fuel can be recharged in site or alternatively the slurry fuel can be processed at another site.

Figure 14:
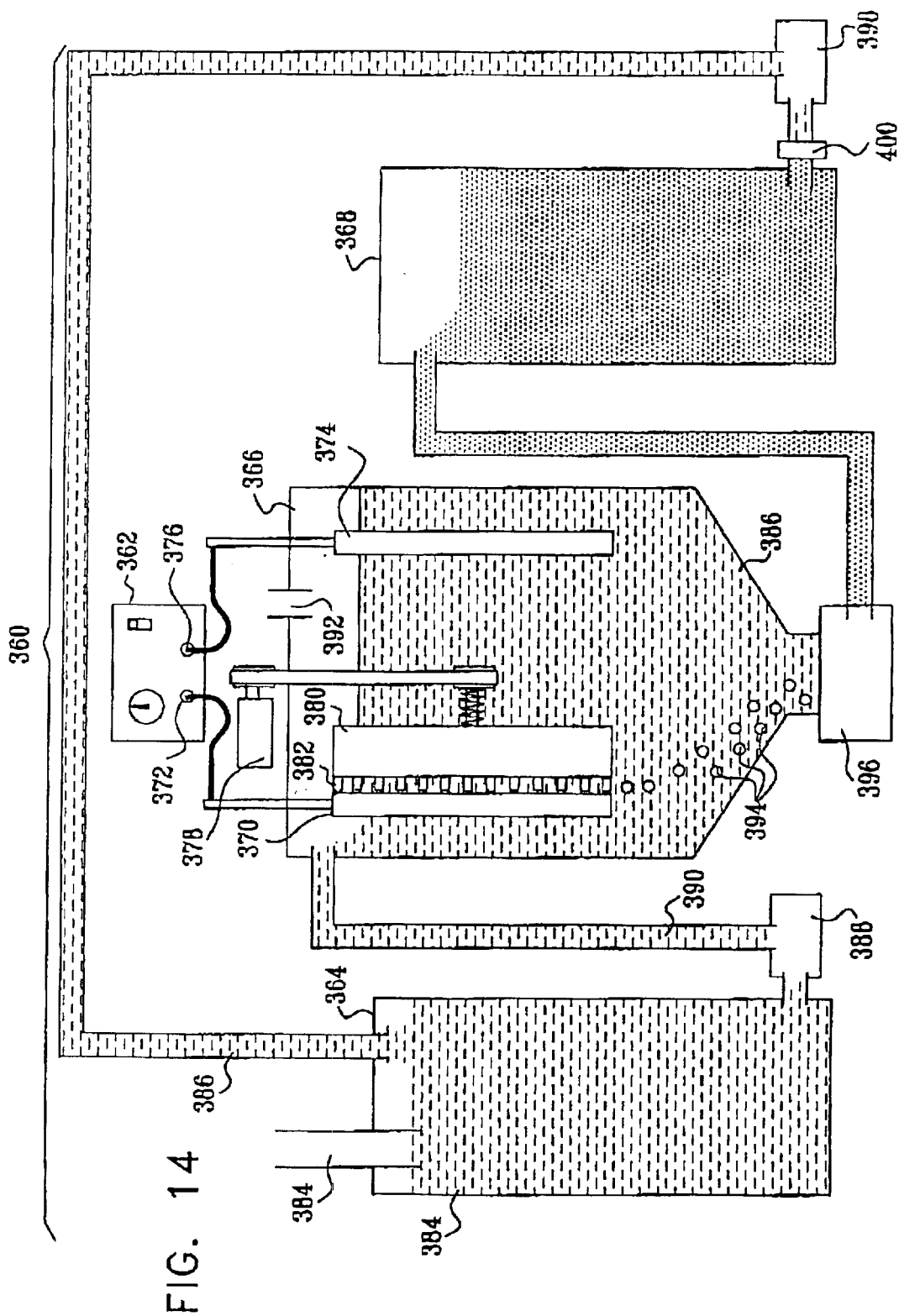
FIG. 14 is a simplified illustration of a preferred embodiment of a slurry fuel recharging system operative for electrically recharging slurry fuel.

Reference is now made to FIG. 14, which is a simplified illustration of a slurry fuel recharging system 360, operative for electrically recharging slurry fuel in accordance with a preferred embodiment of the present invention.

Preferably the slurry fuel comprises at least one of iron, tin, zinc, cadmium, lead, metal hydrides based on nickel or titanium or rare earth metals, and alloys thereof disposed in the electrolyte as at least one of powder, granules and coated particles. It is also appreciated that the electrolyte may comprise:
   a salt selected from a group consisting of halides, trihalides, acetates, sulfates, nitrates, borates, acid salts, chromate, stannate, perchlorate and basic salts of Group I metals, ammonium, Group II metals and Group III metals; or a base, preferably comprising hydroxides of potassium, sodium or lithium or their mixtures thereof; or an acid preferably comprising an inorganic acid such as sulfuric acid, or an organic acid such as citric acid, preferably in absorbed or gel form.

In a preferred embodiment of the present solution the metal in the slurry fuel is zinc and the electrolyte is an alkaline electrolyte.

In a preferred embodiment of the present solution a slurry fuel recharging system 360 comprises a DC power supply 362, a slurry fuel solubilizing container 364, a slurry fuel recharging container 366 and a recharged slurry fuel storage container 368. An inert cathode 370, preferably nickel based, is located inside the container 366 and connected to a negative terminal 372 of the DC power supply 362. An inert anode 374, preferably nickel based, is also located inside the container 366 and connected to a positive terminal 376 of the DC power supply 362.

A motor 378 is operative to rotate a scraper paddle 380, preferably formed of a plastic material, having an open structure and including wipers 382, inside the container 366, in contact with the cathode 370. The scraper paddle 380 is operative to scrape deposited materials off the surface of the cathode 370.

In a preferred embodiment of the present invention the process of electrically recharging depleted slurry fuel 384 comprises the following steps:

Step A

Depleted slurry fuel 384, in which most of the zinc has been oxidized to zinc oxide, is poured into solubilizing container 364 and is solubilized thereto using excess electrolyte 386.

Step B

Pump 388 forces solubilized depleted slurry fuel 390 into container 366.

Step C

The DC power supply 362 is switched on and electric current flows between the anode 374 and the cathode 370 and through an electrolyte 386. Zinc electrodeposits on the cathode 370 while oxygen evolves from the anode 374 and out of the container through exit 392.

The motor 378 is operated to rotate the scraper paddle 380 to scrape the zinc off the surface of the cathode 370. Scraped zinc particles 394 fall down through the electrolyte 386 and are pumped by a slurry fuel pump 396 to the recharged slurry fuel storage container 368. Electrolyte pump 398 is operative to pump the electrolyte from the recharged slurry fuel storage tank 368 through at least one filter 400 and back into the container 364.

Reference is now made to FIG. 15, which is a simplified illustration of a slurry fuel hydrogen-recharging system 410, operative for chemically recharging slurry fuel in accordance with a preferred embodiment of the present invention.

Preferably the slurry fuel comprises at least one of iron, tin, cadmium, lead, metal hydrides based on nickel or titanium or rare earth metals, or alloys thereof disposed in the electrolyte as at least one of powder, granules and coated particles.

Preferably the electrolyte comprises:

a salt selected from a group consisting of halides, trihalides, acetates, sulfates, nitrates, borates, acid salts, chromate, stannate, perchlorate and basic salts of Group I metals, ammonium, Group II metals and Group III metals; or a base, preferably comprising hydroxides of potassium sodium or lithium or their mixtures thereof; or an acid preferably comprising an inorganic acid such as sulfuric acid, or an organic acid such as citric acid, typically in absorbed or gel form.

In a preferred embodiment of the present solution the metal in the slurry fuel is iron and the electrolyte is alkaline electrolyte.

In a preferred embodiment of the present solution the slurry-fuel hydrogen-recharging system 410 comprises a container 412, preferably filled with electrolyte 414 and comprising an entry pipe 416 and a valve operated exit pipe 418. A chamber 420, preferably formed inside the container 412, typically comprising an input pipe 422 is operative to receive hydrogen. A hydrogen consuming cathode 424, preferably a hydrophobic gas diffusion cathode, formed as at least one of the walls of the chamber 420 is in contact with the electrolyte 414. At least one current collector 426, is located inside the container 412 and electrically connected to the cathode 424 via electric conductor 428. An electrically insulating separator 430 is located between the cathode 424 and the anode 426. The separator 430 is porous to the electrolyte.

In a preferred embodiment of the present invention the process of chemically recharging the slurry fuel comprises the following steps:

Step A

Depleted slurry fuel 432 is poured into the container 412 via an entry pipe 416. The depleted slurry 432 together with the at least one current collector 426 now form an anode of the slurry-fuel hydrogen-recharging system 410.

Step B

Hydrogen gas is pumped into the chamber 420 via input pipe 422, preferably under pressure, and is consumed by the cathode 424. At the anode the original composition of the slurry fuel is reconstituted while water is formed in the electrolyte 414.

Step C

The recharged slurry fuel is pumped out of the container 412 via exit pipe 418.

It is appreciated that anodes comprising at least one of zinc, iron, tin, cadmium, metal hydrides may be electrolytically or mechanically recharged, in a plate or a slurry form, either in the vehicle or in an out of vehicle recharging unit.

It is also appreciated that anodes comprising at least one of iron, cadmium and metal hydrides can additionally be chemically recharged using reducing agents in the gas phase, such as hydrogen.

Alternatively or additionally, anodes comprising at least one of iron, cadmium and metal hydrides can be chemically recharged using direct reaction with liquid phase reducing agents, for example to directly reduce iron hydroxide back to iron. Preferably the liquid phase reducing agents may be of organic type such as formalin based. Alternatively the liquid phase reducing agents may be of inorganic type such as sodium borohydride based.

It is appreciated that spent aluminum, spent magnesium, spent calcium, spent sodium, and spent lithium, preferably in the form of hydroxides, which cannot be recharged neither using simple aqueous electrolytic means nor in situ chemical means, are preferably sent for recycling in a respective metal recovery plant.

It is appreciated that excess hydrogen should be purged from the hydrogen generator before recharging begins.

It is also appreciated that forced heat dissipation should be applied to the hydrogen generator when operative to generate hydrogen and when being recharged to ensure operation at optimal temperature.

It is further appreciated that some materials, especially heavy metals such as cadmium and lead, are not ecologically safe and therefore their use should be avoided.

It will be appreciated by persons skilled in the art that the present invention is not limited by what has been particularly shown and described herein above. Rather the scope of the present invention includes both combinations and sub-combinations of the various features described hereinabove as well as variations and modifications which would occur to persons skilled in the art upon reading the specifications and which are not in the prior art.

What is claimed is:

1. A hydrogen-fueled motor vehicle comprising:
   at least one hydrogen-fueled locomotion subsystem comprising a fuel cell and an electrical motor powered thereby; and
   at least one refuelable hydrogen generator operative to supply hydrogen fuel to said at least one hydrogen-fueled locomotion subsystem on demand, said at least one refuelable hydrogen generator comprising:
      at least one electrochemical reactor operative to generate said hydrogen fuel from water on demand; and
      a refueling subsystem providing at least one of water, electrolyte hydrogen, a metal containing material and electrical power to said at least one electrochemical reactor.

2. A hydrogen-fueled motor vehicle comprising:
   at least one hydrogen-fueled locomotion subsystem;
   at least one refuelable hydrogen generator operative to supply hydrogen fuel to said at least one hydrogen-fueled locomotion subsystem on demand, said at least one refuelable hydrogen generator comprising:
      at least one electrochemical reactor operative to generate said hydrogen fuel from water on demand; and
      a refueling subsystem providing at least one of water electrode hydrogen a metal containing material and electrical power to said at least one electrochemical reactor; and
   a water recycler operative to supply water produced by said at least one locomotion subsystem to said at least one refuelable hydrogen generator.

3. A hydrogen-fueled motor vehicle comprising:
   at least one hydrogen-fueled locomotion subsystem;
   at least one refuelable hydrogen generator operative to supply hydrogen fuel to said at least one hydrogen-fueled locomotion subsystem on demand, said at least one refuelable hydrogen generator comprising:
      at least one electrochemical reactor operative to generate said hydrogen fuel from water on demand; and
      a refueling subsystem providing at least one of water electrode hydrogen a metal containing material and electrical power to said at least one electrochemical reactor; and
   an operator controlled hydrogen-fuel generation controller which is operative in response to an input from a vehicle operator for determining the quantity of hydrogen generated by said at least one refuelable hydrogen generator at a given time.

4. A hydrogen-fueled motor vehicle comprising:
   at least one hydrogen-fueled locomotion subsystem; and
   at least one refuelable hydrogen generator operative to supply hydrogen fuel to said at least one hydrogen-fueled locomotion subsystem on demand, said at least one refuelable hydrogen generator comprising:
      at least one electrochemical reactor operative to generate said hydrogen fuel from water on demand; and
      a refueling subsystem providing at least one of water electrode hydrogen a metal containing material and electrical power to said at least one electrochemical reactor; and
      at least one hydrophobic cathode comprising at least one of a polytetrafluoroethylene coating, layer and binder.

5. A hydrogen-fueled motor vehicle according to claim 4 and wherein said cathode is operative as a hydrogen-generating and as a hydrogen-consuming electrode.

6. A hydrogen-fueled motor vehicle comprising:
   at least one hydrogen-fueled locomotion subsystem; and
   at least one refuelable hydrogen generator operative to supply hydrogen fuel to said at least one hydrogen-fueled locomotion subsystem on demand, said at least one refuelable hydrogen generator comprising:
      at least one electrochemical reactor operative to generate said hydrogen fuel from water on demand; and
      a refueling subsystem providing at least one of water, electrolyte, hydrogen, a metal containing material and electrical power to said at least one electrochemical reactor, said refueling subsystem being operative to recharge at least a first one of said at least two refuelable hydrogen generators while at least a second one of said at least two refuelable hydrogen generators is operative to supply hydrogen fuel to said at least one hydrogen-fueled locomotion subsystem.

7. A hydrogen-fueled motor vehicle comprising:
   at least one hydrogen-fueled locomotion subsystem; and
   at least one refuelable hydrogen generator operative to supply hydrogen fuel to said at least one hydrogen-fueled locomotion subsystem on demand, said at least one refuelable hydrogen generator comprising:
      at least one electrochemical reactor operative to generate said hydrogen fuel from water on demand; and
      a refueling subsystem providing at least one of water electrode hydrogen a metal containing material and electrical power to said at least one electrochemical reactor, said electrical power being provided by solar cells.

8. A hydrogen-fueled motor vehicle comprising:
   at least one hydrogen-fueled locomotion subsystem; and
   at least one refuelable hydrogen generator operative to supply hydrogen fuel to said at least one hydrogen-fueled locomotion subsystem on demand, said at least one refuelable hydrogen generator comprising:
      at least one electrochemical reactor operative to generate said hydrogen fuel from water on demand; and
      a refueling subsystem providing at least one of water, electrolyte, hydrogen, a metal containing material and electrical power to said at least one electrochemical reactor, said electrical power being provided by regenerative braking.

9. A hydrogen-fueled motor vehicle comprising:
   at least one hydrogen-fueled locomotion subsystem; and
   at least one refuelable hydrogen generator operative to supply hydrogen fuel to said at least one hydrogen-fueled locomotion subsystem on demand, said at least one refuelable hydrogen generator comprising:
      at least two electrochemical reactors operative to generate said hydrogen fuel from water on demand; and
      a refueling subsystem providing at least one of water, electrolyte, hydrogen, a metal containing material and electrical power to said at least one electrochemical reactor, said electrical power being provided to said at least first one of said at least two electrochemical reactors while at least a second one of said at least two electrochemical reactors is generating hydrogen.

10. A hydrogen-fueled motor vehicle comprising:
at least one hydrogen-fueled locomotion subsystem; and
at least one refuelable hydrogen generator operative to supply hydrogen fuel to said at least one hydrogen-fueled locomotion subsystem on demand, said at least one refuelable hydrogen generator comprising:
 at least one electrochemical reactor operative to generate said hydrogen fuel from water on demand; and
 a refueling subsystem providing at least one of water, electrolyte hydrogen, a metal containing material and electrical power to said at least one electrochemical reactor; and
at least one anode, said at least one anode being replaceable and comprising at least one of powder, granules and coated particles.

11. A hydrogen-fueled motor vehicle vehicle comprising:
at least one hydrogen-fueled locomotion subsystem; and
at least one refuelable hydrogen generator operative to supply hydrogen fuel to said at least one hydrogen-fueled locomotion subsystem on demand, said at least one refuelable hydrogen generator comprising:
 at least one electrochemical reactor operative to generate said hydrogen fuel from water on demand; and
 a refueling subsystem providing at least one of water, electrolyte, hydrogen, a metal containing material and electrical power to said at least one electrochemical reactor,
said at least one electrochemical reactor comprising a slowly consumable anode and a quickly consumable electrolyte,
said slowly consumable anode comprising at least one of aluminum and aluminum alloy and said electrolyte comprising at least one of an alkaline electrolyte based on potassium hydroxide solution and a halide electrolyte based on aluminum chloride solution.

12. A hydrogen-fueled motor vehicle comprising:
at least one hydrogen-fueled locomotion subsystem comprising at least one electric motor and at least one fuel cell that provides electric power to said at least one electric motor; and
at least one refuelable hydrogen generator operative to supply hydrogen fuel to said at least one hydrogen-fueled locomotion subsystem on demand, said at least one refuelable hydrogen generator comprising:
 at least one electrochemical reactor operative to generate said hydrogen fuel from water on demand; and
 a refueling subsystem providing at least one of water, electrolyte, hydrogen, a metal containing material and electric power to said at least one electrochemical reactor.

13. A hydrogen-fueled motor vehicle comprising:
at least one hydrogen-fueled locomotion subsystem; and
at least one refuelable hydrogen generator operative to supply hydrogen fuel to said at least one hydrogen-fueled locomotion subsystem on demand, said at least one refuelable hydrogen generator comprising:
 at least one electrochemical reactor operative to generate said hydrogen fuel from water on demand; and
 a refueling subsystem providing at least one of water, electrolyte, hydrogen, a metal containing material and electrical power to said at least one electrochemical reactor,
said at least one electrochemical reactor comprising a water-based fuel comprising:
 at least one of:
  a salt selected from a group comprising at least one of halides, trihalides, acetates, sulfates, nitrates, borates, acid salts, chromate, stannate, perchlorate and basic salts of Group I metals, ammonium, Group II metals and Group III metals;
  a base; and
  an acid;
 at least one of zinc, iron, aluminum, magnesium, tin, calcium, lithium, sodium, metal hydrides based on nickel, titanium, rare earth metals, and alloys thereof; and
 a catalyst based on at least one of a metal and metal oxide belonging to at least one of the platinum metal group and the transition metal group.

14. A hydrogen-fueled motor vehicle according to claim 13 and wherein said catalyst is formed as a coating on at least one rod, said at least one rod being selectibly introduceable into said water-based fuel.

15. A hydrogen-fueled motor vehicle according to claim 13 and wherein said water-based fuel comprises zinc and the catalyst comprises an impurity in the zinc, said impurity is a transition metal.

16. A hydrogen-fueled motor vehicle according to claim 13 and wherein said water-based fuel comprises iron and said catalyst comprises an impurity in the iron, said impurity is a transition metal, which is not iron.

17. A hydrogen-fueled motor vehicle according to claim 13 and wherein said water-based fuel comprises a hydroxide of at least one of potassium, sodium lithium and their mixtures in solution in water.

18. A hydrogen-fueled motor vehicle according to claim 13 and wherein said acid comprises at least one of an inorganic acid and an organic acid.

19. A hydrogen-fueled motor vehicle according to claim 13 and wherein said at least one of zinc, iron, aluminum, magnesium, tin, calcium, lithium, sodium, metal hydrides based on at least one of nickel, titanium, rare earth metals as well as alloys thereof is disposed in said water based fuel as at least one of powder, granules and coated particles.

20. A hydrogen-fueled motor vehicle comprising:
at least one hydrogen-fueled locomotion subsystem; and
at least one refuelable hydrogen generator operative to supply hydrogen fuel to said at least one hydrogen-fueled locomotion subsystem on demand, said at least one refuelable hydrogen generator comprising:
 at least one electrochemical reactor operative to generate said hydrogen fuel from water on demand; and
 a refueling subsystem providing at least one of water, electrolyte, hydrogen, a metal containing material and electrical power to said at least one electrochemical reactor,
said at least one electrochemical reactor comprising:
 a container containing at least one anode, at least one cathode, an electrolyte and a porous separator sheet separating between said at least one anode and said at least one cathode; and
 a resistance providing element connected between said at least one anode and said at least one cathode and being operative to control the rate of production of hydrogen by said at least one electrochemical reactor.

21. A hydrogen-fueled motor vehicle according to claim 20 and wherein said resistance providing element is a pulse width modulator.

22. A hydrogen-fueled motor vehicle according to claim 20 and wherein said at least one electrochemical reactor is controlled by controlling the level of the electrolyte in the container.

23. A hydrogen-fueled motor vehicle according to claim 20 and wherein said at least one anode comprises at least one of zinc, iron and tin in at least one of sheet and plate forms.

24. A hydrogen-fueled motor vehicle according to claim 20 and wherein said at least one anode comprises at least one of cadmium and lead.

25. A hydrogen-fueled motor vehicle according to claim 20 and wherein said at least one anode comprises at least one of zinc, iron, lead, cadmium and tin provided in the form of at least one of pressed powder and paste pressed on an electrically conducting flat support.

26. A hydrogen-fueled motor vehicle according to claim 20 and wherein said at least one cathode comprises at least one of an electrically conducting plate and an electrically conducting mesh supporting a catalyst for hydrogen production, said catalyst comprising at least one of material based on the platinum metal group and the transition metal group.

27. A hydrogen-fueled motor vehicle according to claim 20 and wherein said electrolyte comprises at least one of salts, acids and bases in the form of at least one of absorbed and gel.

28. A hydrogen-fueled motor vehicle according to claim 27 and wherein said base comprises at least one of hydroxides of potassium, sodium, lithium and their mixtures in solution in water.

29. A hydrogen-fueled motor vehicle according to claim 27 and wherein said acid comprises at least one of an inorganic acid and an organic acid.

30. A hydrogen-fueled motor vehicle comprising:
at least one hydrogen-fueled locomotion subsystem; and
at least one refuelable hydrogen generator operative to supply hydrogen fuel to said at least one hydrogen-fueled locomotion subsystem on demand, said at least one refuelable hydrogen generator comprising:
at least one electrochemical reactor operative to generate said hydrogen fuel from water on demand; and
a refueling subsystem providing at least one of water, electrolyte, hydrogen, a metal containing material and electrical power to said at least one electrochemical reactor,
said at least one electrochemical reactor comprising a container containing at least one anode, at least one cathode, an electrolyte, and water based fuel;
said at least one anode comprising an electrical conductor and being in direct electrical contact with said water based fuel; and
said at least one cathode comprising an electrical conductor and being coated with a catalyst based on at least one of a metal and metal oxide belonging to at least one of the platinum metal group and the transition metal group; and
said electrolyte comprising at least one of:
a salt comprising at least one of halides, trihalides, acetates, sulfates, nitrates, borates, acid salts, chromate, stannate, perchlorate and basic salts of Group I metals, ammonium, Group II metals and Group III metals;
a base comprising at least one of hydroxides of potassium, sodium, lithium and their mixtures; and
an acid comprising at least one of an inorganic and an organic acid; and
at least one of zinc, iron, tin, calcium, metal hydrides based on nickel, titanium, rare earth metals and alloys, and
said water based fuel being disposed in the electrolyte as at least one of powder, granules and coated particles.

31. A hydrogen-fueled motor vehicle comprising:
at least one hydrogen-fueled locomotion subsystem comprising a fuel cell and an electrical motor powered thereby; and
at least one hydrogen generator operative to supply hydrogen fuel to said at least one hydrogen-fueled locomotion subsystem, said at least one hydrogen generator comprising:
an electrochemical reactor operative to generate said hydrogen fuel from water on demand; and
a refueling subsystem enabling at least one of water, electrolyte, hydrogen, metal, electrical power and a replacement hydrogen generator to be provided to said vehicle.

32. A hydrogen-fueled motor vehicle comprising:
at least one hydrogen-fueled locomotion subsystem;
at least one hydrogen generator operative to supply hydrogen fuel to said at least one hydrogen-fueled locomotion subsystem, said at least one hydrogen generator comprising:
an electrochemical reactor operative to generate said hydrogen fuel from water on demand; and
a refueling subsystem enabling at least one of water, electrolyte, hydrogen, metal, electrical power and a replacement hydrogen generator to be provided to said vehicle; and
a water recycler operative to supply water produced by said at least one locomotion subsystem to said at least one hydrogen generator.

33. A hydrogen-fueled motor vehicle comprising:
at least one hydrogen-fueled locomotion subsystem; and
at least one hydrogen generator operative to supply hydrogen fuel to said at least one hydrogen-fueled locomotion subsystem, said at least one hydrogen generator comprising:
an electrochemical reactor operative to generate said hydrogen fuel from water on demand;
a refueling subsystem enabling at least one of water, electrolyte, hydrogen, metal, electrical power and a replacement hydrogen generator to be provided to said vehicle; and
at least one hydrophobic cathode comprising at least one of a polytetrafluoroethylene coating, layer and binder.

34. A hydrogen-fueled motor vehicle according to claim 33 and wherein said at least one cathode is operative as a hydrogen-generating and as a hydrogen-consuming electrode.

35. A hydrogen-fueled motor vehicle comprising:
at least one hydrogen-fueled locomotion subsystem; and
at least two hydrogen generators operative to supply hydrogen fuel to said at least one hydrogen-fueled locomotion subsystem, each of said at least two hydrogen generators comprising:
an electrochemical reactor operative to generate said hydrogen fuel from water on demand; and
a refueling subsystem enabling at least one of water, electrolyte, hydrogen, metal, electrical power and a replacement hydrogen generator to be provided to said vehicle, said refueling subsystem being operative to recharge at least a first one of said at least two hydrogen generators while at least a second one of said at least two hydrogen generators is operative to supply hydrogen fuel to said hydrogen-fueled locomotion subsystem.

36. A hydrogen-fueled motor vehicle comprising:
at least one hydrogen-fueled locomotion subsystem; and
at least one hydrogen generator operative to supply hydrogen fuel to said at least one hydrogen-fueled locomotion subsystem, said at least one hydrogen generator comprising:
an electrochemical reactor operative to generate said hydrogen fuel from water on demand; and
a refueling subsystem enabling at least one of water, electrolyte, hydrogen, metal, electrical rower and a replacement hydrogen generator to be provided to said vehicle, said electrical power being provided by solar cells.

37. A hydrogen-fueled motor vehicle comprising:
at least one hydrogen-fueled locomotion subsystem; and
at least one hydrogen generator operative to supply hydrogen fuel to said at least one hydrogen-fueled locomotion subsystem, said at least one hydrogen generator comprising:
an electrochemical reactor operative to generate said hydrogen fuel from water on demand; and
a refueling subsystem enabling at least one of water, electrolyte, hydrogen, metal, electrical power and a replacement hydrogen generator to be provided to said vehicle, said electrical power being is provided by regenerative braking.

38. A hydrogen-fueled motor vehicle comprising:
at least one hydrogen-fueled locomotion subsystem; and
at least one hydrogen generator operative to supply hydrogen fuel to said at least one hydrogen-fueled locomotion subsystem, said at least one hydrogen generator comprising:
an electrochemical reactor operative to generate said hydrogen fuel from water on demand;
a refueling subsystem enabling at least one of water, electrolyte, hydrogen, metal, electrical power and a replacement hydrogen generator to be provided to said vehicle; and
at least one anode,
said at least one anode being replaceable and comprising at least one of powder, granules and coated particles.

39. A hydrogen-fueled motor vehicle comprising:
at least one hydrogen-fueled locomotion subsystem; and
at least one hydrogen generator operative to supply hydrogen fuel to said at least one hydrogen-fueled locomotion subsystem, said at least one hydrogen generator comprising:
an electrochemical reactor operative to generate said hydrogen fuel from water on demand; and
a refueling subsystem enabling at least one of water, electrolyte, hydrogen, metal, electrical power and a replacement hydrogen generator to be provided to said vehicle,
said electrochemical reactor comprising a slowly consumable anode and a quickly consumable electrolyte,
said slowly consumable anode comprising at least one of aluminum and aluminum alloy and said electrolyte comprising at least one of an alkaline electrolyte based on potassium hydroxide solution and a halide electrolyte based on aluminum chloride solution.

40. A hydrogen-fueled motor vehicle comprising:
at least one hydrogen-fueled locomotion subsystem comprising at least one electric motor and at least one fuel cell that provides electric power to said at least one electric motor; and
at least one hydrogen generator operative to supply hydrogen fuel to said at least one hydrogen-fueled locomotion subsystem, said at least one hydrogen generator comprising:
an electrochemical reactor operative to generate said hydrogen fuel from water on demand; and
a refueling subsystem enabling at least one of water, electrolyte, hydrogen, metal, electric power and a replacement hydrogen generator to be provided to said vehicle.

41. A hydrogen-fueled motor vehicle according to claim 40 and wherein said electrochemical reactor is operative to provide electric power to said at least one electric motor.

42. A hydrogen-fueled motor vehicle system comprising:
at least one hydrogen-fueled motor vehicle including:
a hydrogen-fueled locomotion subsystem comprising a fuel cell and an electrical motor powered thereby; and
a hydrogen generator operative to supply hydrogen fuel to said hydrogen-fueled locomotion subsystem, said hydrogen generator comprising an electrochemical reactor operative to generate said hydrogen fuel from water on demand; and
a refueling subsystem enabling at least one of water, electrolyte, hydrogen, metal, electrical power and a replacement hydrogen generator to be provided said at least one vehicle.

43. A hydrogen-fueled motor vehicle system comprising:
at least one hydrogen-fueled motor vehicle including:
a hydrogen-fueled locomotion subsystem;
a hydrogen generator operative to supply hydrogen fuel to said hydrogen-fueled locomotion subsystem, said hydrogen generator comprising an electrochemical reactor operative to generate said hydrogen fuel from water on demand; and
a water recycler operative to supply water produced by said locomotion subsystem to said hydrogen generator; and
a refueling subsystem enabling at least one of water, electrolyte, hydrogen, metal, electrical power and a replacement hydrogen generator to be provided to said at least one vehicle.

44. A hydrogen-fueled motor vehicle system comprising:
at least one hydrogen-fueled motor vehicle including:
a hydrogen-fueled locomotion subsystem; and
a hydrogen generator operative to supply hydrogen fuel to said hydrogen-fueled locomotion subsystem, said hydrogen generator comprising:
an electrochemical reactor operative to generate said hydrogen fuel from water on demand; and
at least one hydrophobic cathode comprising at least one of a polytetrafluoroethylene coating, layer and binder; and
a refueling subsystem enabling at least one of water, electrolyte, hydrogen, metal, electrical power and a replacement hydrogen generator to be provided to said at least one vehicle.

45. A hydrogen-fueled motor vehicle system according to claim 44 and wherein said at least one cathode is operative as a hydrogen-generating and as a hydrogen-consuming electrode.

46. A hydrogen-fueled motor vehicle system comprising:
at least one hydrogen-fueled motor vehicle including:
a hydrogen-fueled locomotion subsystem; and
at least two hydrogen generators operative to supply hydrogen fuel to said hydrogen-fueled locomotion subsystem, each of said at least two hydrogen generators comprising an electrochemical reactor operative to generate said hydrogen fuel from water on demand; and a refueling subsystem enabling at least one of water, electrolyte, hydrogen, metal, electrical power and a replacement hydrogen generator to be provided to said at least one vehicle, said refueling subsystem being operative to recharge at least a first one of said at least two hydrogen generators while at least a second one of said at least two other hydrogen generators is operative to supply hydrogen fuel to said hydrogen-fueled locomotion subsystem.

47. A hydrogen-fueled motor vehicle system comprising:
at least one hydrogen-fueled motor vehicle including:
  a hydrogen-fueled locomotion subsystem; and
  a hydrogen generator operative to supply hydrogen fuel to said hydrogen-fueled locomotion subsystem, said hydrogen generator comprising:
    an electrochemical reactor operative, to generate said hydrogen fuel from water on demand; and
    at least one anode; and
a refueling subsystem enabling at least one of water, electrolyte, hydrogen, metal, electrical power and a replacement hydrogen generator to be provided to said at least one vehicle,
said at least one anode being replaceable and comprising at least one of powder, granules and coated particles.

48. A hydrogen-fueled motor vehicle system comprising:
at least one hydrogen-fueled motor vehicle including:
  a hydrogen-fueled locomotion subsystem; and
  a hydrogen generator operative to supply hydrogen fuel to said hydrogen-fueled locomotion subsystem, said hydrogen generator comprising an electrochemical reactor operative to generate said hydrogen fuel from water on demand; and
a refueling subsystem enabling at least one of water, electrolyte, hydrogen, metal, electric power and a replacement hydrogen generator to be provided to said at least one vehicle,
said electrochemical reactor comprising a slowly consumable anode and a quickly consumable electrolyte,
said slowly consumable anode comprising at least one of aluminum and aluminum alloy, and
said quickly consumable electrolyte comprising at least one of an alkaline electrolyte based on potassium hydroxide solution and a halide electrolyte based on aluminum chloride solution.

49. A hydrogen-fueled motor vehicle system comprising:
at least one hydrogen-fueled motor vehicle including:
  a hydrogen-fueled locomotion subsystem comprising at least one electric motor and at least one fuel cell that provides electric power to said at least one electric motor; and
  a hydrogen generator operative to supply hydrogen fuel to said hydrogen-fueled locomotion subsystem, said hydrogen generator comprising an electrochemical reactor operative to generate said hydrogen fuel from water on demand; and
a refueling subsystem enabling at least one of water, electrolyte, hydrogen, metal, electric power and a replacement hydrogen generator to be provided to said at least one vehicle.

50. A hydrogen-fueled motor vehicle system according to claim 49 and wherein said electrochemical reactor is operative to provide electric power to said at least one electric motor.

51. A hydrogen-fueled motor vehicle system comprising:
at least one hydrogen-fueled motor vehicle including:
  a hydrogen-fueled locomotion subsystem; and
  a hydrogen generator operative to supply hydrogen fuel to said hydrogen-fueled locomotion subsystem, said hydrogen generator comprising an electrochemical reactor operative to generate said hydrogen fuel from water on demand; and
a refueling subsystem enabling at least one of water, electrolyte, hydrogen, metal, electrical power and a replacement hydrogen generator to be provided to said at least one vehicle,
said electrical power being provided by solar cells.

52. A hydrogen-fueled motor vehicle system comprising:
at least one hydrogen-fueled motor vehicle including:
  a hydrogen-fueled locomotion subsystem; and
  a hydrogen generator operative to supply hydrogen fuel to said hydrogen-fueled locomotion subsystem, said hydrogen generator comprising an electrochemical reactor operative to generate said hydrogen fuel from water on demand; and
a refueling subsystem enabling at least one of water, electrolyte, hydrogen, metal, electrical power and a replacement hydrogen generator to be provided to said at least one vehicle,
said electrical power being provided by regenerative braking.

53. A hydrogen-fueled motor vehicle system comprising:
at least one hydrogen-fueled motor vehicle including:
  a hydrogen-fueled locomotion subsystem; and
  a hydrogen generator operative to supply hydrogen fuel to said hydrogen-fueled locomotion subsystem, said hydrogen generator comprising at least two electrochemical reactors operative to generate said hydrogen fuel from water on demand; and
a refueling subsystem enabling at least one of water, electrolyte, hydrogen, metal, electrical power and a replacement hydrogen generator to be provided to said at least one vehicle,
said electrical power being provided to at least a first one of said at least two electrochemical reactors while at least a second one of said at least two electrochemical reactors is generating hydrogen.

54. A method for recharging a hydrogen-fueled motor vehicle comprising
at least one hydrogen-fueled locomotion subsystem comprising a fuel cell, and an electrical motor powered thereby; and
at least one refuelable hydrogen generator operative to supply hydrogen fuel to said at least one hydrogen-fueled locomotion subsystem on demand, said at least one refuelable hydrogen generator comprising an electrochemical reactor operative to generate said hydrogen fuel from water on demand, the method comprising:
supplying at least one of water, electrolyte, hydrogen, a metal containing material and electrical power to said electrochemical reactor.

55. A method for recharging a hydrogen-fueled motor vehicle comprising
at least one hydrogen-fueled locomotion subsystem; and
at least one refuelable hydrogen generator operative to supply hydrogen fuel to said at least one hydrogen-fueled locomotion subsystem on demand, said at least one refuelable hydrogen generator comprising an electrochemical reactor operative to generate said hydrogen fuel from water on demand, the method comprising:

supplying at least one of water, electrolyte, hydrogen, a metal containing material and electrical power to said electrochemical reactor; and recycling water produced by said at least one locomotion subsystem to said at least one refuelable hydrogen generator.

56. A method for recharging a hydrogen-fueled motor vehicle comprising at least one hydrogen-fueled locomotion subsystem; and at least one refuelable hydrogen generator operative to supply hydrogen fuel to said at least one hydrogen-fueled locomotion subsystem on demand, said at least one refuelable hydrogen generator comprising an electrochemical reactor operative to generate said hydrogen fuel from water on demand, said electrochemical reactor comprising an anode and a cathode, the method comprising:

supplying at least one of water, electrolyte, hydrogen, a metal containing material and electrical rower to said electrochemical reactor, said supplying comprising:

providing an electrical connection between said anode and said cathode; and providing hydrogen gas to said cathode.

57. A method for recharging a hydrogen-fueled motor vehicle comprising at least one hydrogen-fueled locomotion subsystem; and at least one refuelable hydrogen generator operative to supply hydrogen fuel to said at least one hydrogen-fueled locomotion subsystem on demand, said at least one refuelable hydrogen generator comprising at least two electrochemical reactors operative to generate said hydrogen fuel from water on demand, each of said at least two electrochemical reactors comprising an anode and a cathode, the method comprising:

supplying at least one of water, electrolyte, hydrogen, a metal containing material and electrical power to at least a first one of said at least two electrochemical reactors, said supplying comprising:

providing an electrical connection between said anode and said cathode of said at least first one of said at least two electrochemical reactors; and providing hydrogen gas to said cathode of said at least first one of said at least two electrochemical reactors while at least a second one of said at least two electrochemical reactors generates hydrogen.

58. A method for recharging a hydrogen-fueled motor vehicle, the method comprising:

providing at least one hydrogen-fueled locomotion subsystem including a fuel cell and an electrical motor powered thereby;

providing at least one hydrogen generator operative to supply hydrogen fuel to said at least one hydrogen-fueled locomotion subsystem, said providing at least one hydrogen generator comprising providing an electrochemical reactor operative to generate said hydrogen fuel from water on demand;

providing a refueling subsystem enabling at least one of water, hydrogen, metal, electrical power and a replacement hydrogen generator to be provided to said vehicle; and supplying at least one of water, electrolyte, hydrogen, a metal containing material and electrical rower from said refueling subsystem to said electrochemical reactor.

59. A method for recharging a hydrogen-fueled motor vehicle, the method comprising:

providing at least one hydrogen-fueled locomotion subsystem;

providing at least one hydrogen generator operative to supply hydrogen fuel to said at least one hydrogen-fueled locomotion subsystem, said providing at least one hydrogen generator comprising providing an electrochemical reactor operative to generate said hydrogen fuel from water on demand;

providing a refueling subsystem enabling at least one of water, hydrogen, metal, electrical power and a replacement hydrogen generator to be provided to said vehicle;

supplying at least one of water, electrolyte, hydrogen, a metal containing material and electrical power from said refueling subsystem to said electrochemical reactor; and recycling water produced by said at least one locomotion subsystem to said at least one hydrogen generator.

60. A method for recharging a hydrogen-fueled motor vehicle, the method comprising:

providing at least one hydrogen-fueled locomotion subsystem;

providing at least one hydrogen generator operative to supply hydrogen fuel to said at least one hydrogen-fueled locomotion subsystem, said providing at least one hydrogen generator comprising providing an electrochemical reactor operative to generate said hydrogen fuel from water on demand, said electrochemical reactor comprising an anode and a cathode;

providing a refueling subsystem enabling at least one of water, hydrogen, metal, electrical power and a replacement hydrogen generator to be provided to said vehicle; and supplying at least one of water, electrolyte, hydrogen, a metal containing material and electrical power from said refueling subsystem to said electrochemical reactor, said supplying comprising:

providing an electrical connection between said anode and said cathode of said at least one hydrogen generator; and providing hydrogen gas to said cathode.

61. A method for recharging a hydrogen-fueled motor vehicle, the method comprising:

providing at least one hydrogen-fueled locomotion subsystem;

providing at least one hydrogen generator operative to supply hydrogen fuel to said at least one hydrogen-fueled locomotion subsystem, said providing at least one hydrogen generator comprising providing at least two electrochemical reactors operative to generate said hydrogen fuel from water on demand, each of said at least two electrochemical reactors comprising an anode and a cathode;

providing a refueling subsystem enabling at least one of water, hydrogen, metal, electrical power and a replacement hydrogen generator to be provided to said vehicle; and supplying at least one of water, electrolyte, hydrogen, a metal containing material and electrical power from said refueling subsystem to at least a first one of said at least two electrochemical reactors, said supplying comprising:

providing an electrical connection between said anode and said cathode of said at least first one of said at least two electrochemical reactors; and providing hydrogen gas to said cathode of said at least first one of said at least two electrochemical reactors while at least a second one of said at least two electrochemical reactors generates hydrogen.

62. A method for recharging a hydrogen-fueled motor vehicle system comprising:
   providing at least one hydrogen-fueled motor vehicle including at least one hydrogen-fueled locomotion subsystem including a fuel cell and an electrical motor powered thereby and at least one hydrogen generator operative to supply hydrogen fuel to said at least one hydrogen-fueled locomotion subsystem, said at least one hydrogen generator comprising an electrochemical reactor operative to generate said hydrogen fuel from water on demand; and
   supplying at least one of water, electrolyte, hydrogen, a metal containing material and electrical power to said electrochemical reactor.

63. A method for recharging a hydrogen-fueled motor vehicle system comprising:
   providing at least one hydrogen-fueled motor vehicle including at least one hydrogen-fueled locomotion subsystem and at least one hydrogen generator operative to supply hydrogen fuel to said at least one hydrogen-fueled locomotion subsystem, said at least one hydrogen generator comprising an electrochemical reactor operative to generate said hydrogen fuel from water on demand;
   supplying at least one of water, electrolyte, hydrogen, a metal containing material and electrical power to said electrochemical reactor; and
   recycling water produced by said at least one locomotion subsystem to said at least one hydrogen generator.

64. A method for recharging a hydrogen-fueled motor vehicle system comprising:
   providing at least one hydrogen-fueled motor vehicle including at least one hydrogen-fueled locomotion subsystem and at least one hydrogen generator operative to supply hydrogen fuel to said at least one hydrogen-fueled locomotion subsystem, said at least one hydrogen generator comprising an electrochemical reactor operative to generate said hydrogen fuel from water on demand, said electrochemical reactor comprising an anode and a cathode; and
   supplying at least one of water, electrolyte, hydrogen, a metal containing material and electrical power to said electrochemical reactor, said supplying comprising:
      providing an electrical connection between said anode and said cathode; and
      providing hydrogen gas to said cathode.

65. A method for recharging a hydrogen-fueled motor vehicle system comprising:
   providing at least one hydrogen-fueled motor vehicle including at least one hydrogen-fueled locomotion subsystem and at least one hydrogen generator operative to supply hydrogen fuel to said at least one hydrogen-fueled locomotion subsystem, said at least one hydrogen generator comprising at least two electrochemical reactors operative to generate said hydrogen fuel from water on demand, each of said at least two electrochemical reactors comprising an anode and a cathode; and
   supplying at least one of water, electrolyte, hydrogen, a metal containing material and electrical power to at least a first one of said two electrochemical reactors, said supplying comprising:
      providing an electrical connection between said anode and said cathode of said at least first one of said at least two electrochemical reactors; and
      providing hydrogen gas to said cathode of said at least first one of said at least two electrochemical reactors while at least a second one of said at least two electrochemical reactors generates hydrogen.

66. A method for recharging a hydrogen-fueled motor vehicle comprising:
   providing a chemical reactor comprising a container containing at least one anode, at least one cathode, an electrolyte and water based fuel;
   wherein said at least one anode comprises an electrical conductor and is in direct electrical contact with said water based fuel; and
   wherein said at least one cathode comprises an electrical conductor and is coated with a catalyst based on at least one of a metal and metal oxide belonging to at least one of the platinum metal group and the transition metal group; and
   wherein said electrolyte comprises at least one of:
      a salt comprising at least one of halides, trihalides, acetates, sulfates, nitrates, borates, acid salts, chromate, stannate, perchlorate and basic salts of Group I metals, ammonium, Group II metals and Group III metals;
      a base comprising at least one of hydroxides of potassium, sodium, lithium and their mixtures; and
      an acid comprising at least one of an inorganic and an organic acid; and
      at least one of zinc, iron, tin, calcium, metal hydrides based on nickel, titanium, rare earth metals and alloys;
      and wherein said water based fuel is disposed in the electrolyte as at least one of powder, granules and coated particles,
   the method further comprising:
      draining depleted water based fuel;
      supplying recharged water based fuel; and
      supplying said electrolyte.

67. A method for recharging a water based fuel comprising:
   providing a DC power supply;
   providing at least one inert cathode connected to a negative terminal of said DC power supply;
   providing at least one inert anode connected to a positive terminal of said DC power supply;
   providing at least one motor operative to rotate a scraper paddle operative to scrape deposited materials off the surface of said at least one cathode;
   supplying depleted water based fuel comprising:
      at least one of iron, tin, zinc, cadmium, lead, metal hydrides based on nickel, titanium, rare earth metals, and alloys thereof disposed as at least one of powder, granules and coated particles;
   supplying an electrolyte comprising at least one of:
      a salt selected from a group consisting of halides, trihalides, acetates, sulfates, nitrates, borates, acid salts, chromate, stannate, perchlorate and basic salts of Group I metals, ammonium, Group II metals and Group III metals;
      a base, comprising hydroxides at least one of potassium, sodium, lithium and their mixtures; and
      an acid comprising at least one of an inorganic and an organic acid;
   at least one of solubilizing and dispersing said depleted water based fuel;
   applying DC power between said at least one anode and said at least one cathode; and operating said at least one motor to propel said scraper paddle to scrape said deposited materials of the surface of said at least one cathode.

68. A method for recharging a water based fuel comprising:

providing a container filled with an electrolyte, said electrolyte including at least one of: a salt selected from a group consisting of halides, trihalides, acetates, sulfates, nitrates, borates, acid salts, chromate, stannate, perchlorate and basic salts of Group I metals, ammonium, Group II metals and Group III metals; a base comprising at least one of hydroxides of potassium, sodium, lithium and their mixtures thereof; and an acid comprising at least one of an inorganic acid and an organic acid;

providing a chamber formed inside said container;

providing at least one hydrophobic gas diffusion, hydrogen consuming, cathode, formed as at least one of the walls of said chamber;

providing at least one current collector electrically connected to said at least one cathode;

providing a porous, electrically insulating separator between said at least one cathode and an anode;

supplying said electrolyte;

supplying depleted water based fuel comprising at least one of zinc, iron, tin, cadmium, lead, metal hydrides based on at least one of nickel and titanium and rare earth metals and alloys thereof disposed in said electrolyte as at least one of powder, granules and coated particles;

supplying hydrogen gas to said chamber.

* * * * *

UNITED STATES PATENT AND TRADEMARK OFFICE
CERTIFICATE OF CORRECTION

PATENT NO. : 6,770,186 B2
DATED : August 3, 2004
INVENTOR(S) : Oren Rosenfeld et al.

It is certified that error appears in the above-identified patent and that said Letters Patent is hereby corrected as shown below:

Title page,
Item [75], "Sandeerman" should read -- Sandlerman --.

Signed and Sealed this

Thirtieth Day of November, 2004

JON W. DUDAS
*Director of the United States Patent and Trademark Office*